(12) United States Patent
Kroslid et al.

(10) Patent No.: US 11,939,859 B2
(45) Date of Patent: Mar. 26, 2024

(54) PERFORMANCE BASED CONDITION MONITORING

(71) Applicant: Schlumberger Technology Corporation, Sugar Land, TX (US)

(72) Inventors: Geir Kroslid, Kristiansand (NO); Johan Lindal Haug, Kristiansand (NO)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 352 days.

(21) Appl. No.: 16/753,073

(22) PCT Filed: Oct. 2, 2018

(86) PCT No.: PCT/US2018/053865
§ 371 (c)(1),
(2) Date: May 15, 2020

(87) PCT Pub. No.: WO2019/074712
PCT Pub. Date: Apr. 18, 2019

(65) Prior Publication Data
US 2020/0291767 A1  Sep. 17, 2020

Related U.S. Application Data

(60) Provisional application No. 62/566,889, filed on Oct. 2, 2017.

(51) Int. Cl.
*E21B 47/09* (2012.01)
*E21B 41/00* (2006.01)
(Continued)

(52) U.S. Cl.
CPC ............. *E21B 47/09* (2013.01); *E21B 41/00* (2013.01); *E21B 47/12* (2013.01); *G05B 15/02* (2013.01); *G06F 17/18* (2013.01)

(58) Field of Classification Search
CPC .................................. E21B 47/12; E21B 12/02
See application file for complete search history.

(56) References Cited

U.S. PATENT DOCUMENTS 5,507,467 A    4/1996  Mott
5,978,749 A   11/1999  Likins, Jr. et al.
(Continued)

FOREIGN PATENT DOCUMENTS

WO    WO-2016060649 A1 *  4/2016  ........... E21B 43/128
WO    WO-2017051032 A1 *  3/2017

OTHER PUBLICATIONS

International Search Report and Written Opinion issued in International Patent application PCT/US2018/053865 dated Apr. 1, 2019, 12 pages.

(Continued)

*Primary Examiner* — Kevin Kim
(74) *Attorney, Agent, or Firm* — Jeffrey D. Frantz

(57) ABSTRACT

Systems and methods for utilizing performance based condition monitoring to determine health condition of wellsite equipment. A method may include operating a piece of equipment at an oil and gas wellsite by performing a plurality actions by a component of the piece of equipment, and generating a plurality of sensor measurements, wherein each sensor measurement is indicative of a corresponding action. The method may further include receiving the plurality of sensor measurements by a processing system, calculating a condition indicator for each component based on a corresponding sensor measurement, recording each condition indicator over a period of time, and determining condition of the piece of equipment based on at least one of the condition indicators recorded over time.

24 Claims, 8 Drawing Sheets

(51) Int. Cl.
*E21B 47/12* (2012.01)
*G05B 15/02* (2006.01)
*G06F 17/18* (2006.01)

(56) References Cited

U.S. PATENT DOCUMENTS

| | | | |
|---|---|---|---|
| 6,712,160 B1* | 3/2004 | Schultz | E21B 41/0085 |
| | | | 175/48 |
| 7,925,472 B2 | 4/2011 | Nasr et al. | |
| 8,347,957 B2 | 1/2013 | Stephenson et al. | |
| 8,676,721 B2 | 3/2014 | Piovesan et al. | |
| 9,260,943 B2 | 2/2016 | Eriksson et al. | |
| 9,359,831 B2 | 6/2016 | Bradley et al. | |
| 9,934,479 B2 | 4/2018 | Sanchez et al. | |
| 10,215,009 B2 | 2/2019 | Tjostheim et al. | |
| 10,221,674 B2 | 3/2019 | Samuel | |
| 10,400,511 B2 | 9/2019 | Netecke et al. | |
| 11,060,361 B2 | 6/2021 | Berry et al. | |
| 2002/0018399 A1 | 2/2002 | Schultz et al. | |
| 2011/0203848 A1* | 8/2011 | Krueger | E21B 21/08 |
| | | | 175/215 |
| 2013/0068479 A1 | 3/2013 | AlDossary | |
| 2014/0064029 A1* | 3/2014 | Jaffrey | E21B 33/0355 |
| | | | 367/81 |
| 2014/0121973 A1 | 5/2014 | Buchanan et al. | |
| 2015/0022326 A1 | 1/2015 | Baxter et al. | |
| 2015/0337599 A1 | 11/2015 | Bullock | |
| 2015/0356521 A1 | 12/2015 | Sridhar et al. | |
| 2016/0292652 A1 | 10/2016 | Bowden, Jr. et al. | |
| 2016/0371957 A1 | 12/2016 | Ghaffari et al. | |
| 2017/0090457 A1 | 3/2017 | Pandurangan et al. | |
| 2017/0152967 A1 | 6/2017 | Jaffrey | |
| 2017/0268323 A1 | 9/2017 | Dykstra et al. | |
| 2018/0087342 A1 | 3/2018 | Gottlieb | |
| 2018/0238134 A1 | 8/2018 | Reyes | |
| 2018/0293551 A1 | 10/2018 | Buca | |
| 2018/0363421 A1 | 12/2018 | Harshbarger et al. | |
| 2019/0120023 A1 | 4/2019 | Ocegueda-Hernandez et al. | |
| 2020/0326375 A1 | 10/2020 | Camacho Cardenas et al. | |
| 2021/0102530 A1 | 4/2021 | Pruitt et al. | |
| 2021/0190177 A1 | 6/2021 | Suß | |

OTHER PUBLICATIONS

International Preliminary Report on Patentability issued in International Patent application PCT/US2018/053865, dated Apr. 8, 2020, 8 pages.

International Search Report and Written Opinion issued in International Patent application PCT/US2022/048826 dated Mar. 15, 2023, 12 pages.

* cited by examiner

PERFORMANCE BASED CONDITION MONITORING

CROSS-REFERENCE TO RELATED APPLICATIONS

This application claims priority to and the benefit of U.S. Provisional Application No. 62/566,889, titled "PERFORMANCE CONDITION MONITORING," filed Oct. 2, 2017, the entire disclosure of which is hereby incorporated herein by reference.

BACKGROUND OF THE DISCLOSURE

Wells are generally drilled into the ground or ocean bed to recover natural deposits of oil, gas, and other materials that are trapped in subterranean formations. Well construction operations (e.g., drilling operations) may be performed at a wellsite by a drilling system having various surface and subterranean equipment operating in a coordinated manner. A drilling system may utilize a drill bit attached to the lower end of a drill string to drill a well. Drilling fluid may be pumped from a wellsite surface down through the drill string to the drill bit. The drilling fluid lubricates and cools the drill bit, and may additionally carry drill cuttings from the wellbore back to the wellsite surface. Wellsite equipment may be grouped into various subsystems, wherein each subsystem performs a different operation controlled by a corresponding local and/or a remotely located controller.

Condition monitoring is a process of monitoring equipment condition indicators for changes to identify future faults, failures, breakdowns, and other maintenance problems associated with equipment. Condition monitoring is increasingly utilized in the oil and gas industry as part of predictive maintenance of wellsite (e.g., drilling) equipment. Condition monitoring utilizes condition data generated by peripheral (e.g., add-on) sensors and instruments to gain more insight to the future maintenance problems. Condition data, such as vibration data, acoustic data, thermographic (e.g., infrared signature) data, is used solely to indicate condition of equipment. Condition monitoring also includes analyzing operational data to determine amount of equipment usage and compare the determined equipment usage to expected operational lifetime specifications and/or calculations.

However, current condition monitoring products do not provide adequate operational efficiency measurements and analytics for wellsite operations. Such products may provide drill rig state detection, calculations of operational key performance indicators (KPIs), and customized dashboards and reporting tools. Common to such performance monitoring products and services is a top-down monitoring approach, which focuses on performance of an entire piece of equipment and/or system and how such piece of equipment and/or system as a whole contributes to the overall process or operation being performed at the wellsite. For example, drilling operational KPIs help monitor general functionality and/or detect broad operational problems, such as related to performance, non-productive time, and invisible lost time. Such general performance monitoring is capable of determining a reduction in performance on a machine or system level, with limited insight to contextual or specific factors causing such reduction in performance. Thus, current condition monitoring products cannot detect performance reductions affecting a portion or component of a piece of equipment or a small reduction affecting general performance of the piece of equipment. Certain reductions in performance may be recognized by analyzing operational the KPIs of the rig, which may trigger an alarm within the control system. However, alarm thresholds are typically designed with flexibility to handle variations in climate and operational conditions. Thus, current condition monitoring systems will not trigger an alarm unless a decrease in overall performance of equipment is substantial.

Furthermore, current condition monitoring products rely on high quantities of peripheral sensors and instrumentation to monitor condition related parameters, such as oil quality, equipment vibration, acoustic emission, temperature, thermography, and electrical current signature. Implementing such products has a high investment cost and mandates expertise to analyze data generated by the peripheral sensors to forecast equipment faults.

SUMMARY OF THE DISCLOSURE

This summary is provided to introduce a selection of concepts that are further described below in the detailed description. This summary is not intended to identify indispensable features of the claimed subject matter, nor is it intended for use as an aid in limiting the scope of the claimed subject matter.

The present disclosure introduces a computer program product that includes a non-transitory, computer-readable medium including instructions that, when executed by a processor of a processing system, cause the processing system to receive sensor measurements each generated by a corresponding sensor of a piece of equipment at an oil and gas wellsite. The piece of equipment includes actuators each operable to facilitate a corresponding action performed by a component of the piece of equipment. Each sensor measurement is indicative of a corresponding action. The instructions also cause the processing system to calculate a condition indicator for each sensor based on a corresponding sensor measurement, record each condition indicator over a period of time, and determine condition of the piece of equipment based on at least one of the condition indicators recorded over time.

The present disclosure also introduces a method including operating a piece of equipment, at an oil and gas wellsite, by performing actions by a component of the piece of equipment, and generating sensor measurements each indicative of a corresponding action. The method also includes receiving the sensor measurements by a processing system, calculating a condition indicator for each component based on a corresponding sensor measurement, recording each condition indicator over a period of time, and determining condition of the piece of equipment based on at least one of the condition indicators recorded over time.

The present disclosure also introduces a system including a piece of equipment at an oil and gas wellsite and a processing system including a processor and a memory storing a computer program code. The piece of equipment includes actuators each operable to facilitate a corresponding action by a component of the piece of equipment, and sensors each operable to generate a signal indicative of an operational parameter associated with a corresponding action. When executed, the computer program code causes the processing system to determine a condition indicator for each action based on a corresponding signal, record each condition indicator over a period of time, and determine condition of the piece of equipment based on at least one of the condition indicators recorded over time.

These and additional aspects of the present disclosure are set forth in the description that follows, and/or may be learned by a person having ordinary skill in the art by reading the material herein and/or practicing the principles described herein. At least some aspects of the present disclosure may be achieved via means recited in the attached claims.

BRIEF DESCRIPTION OF THE DRAWINGS

The present disclosure is understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
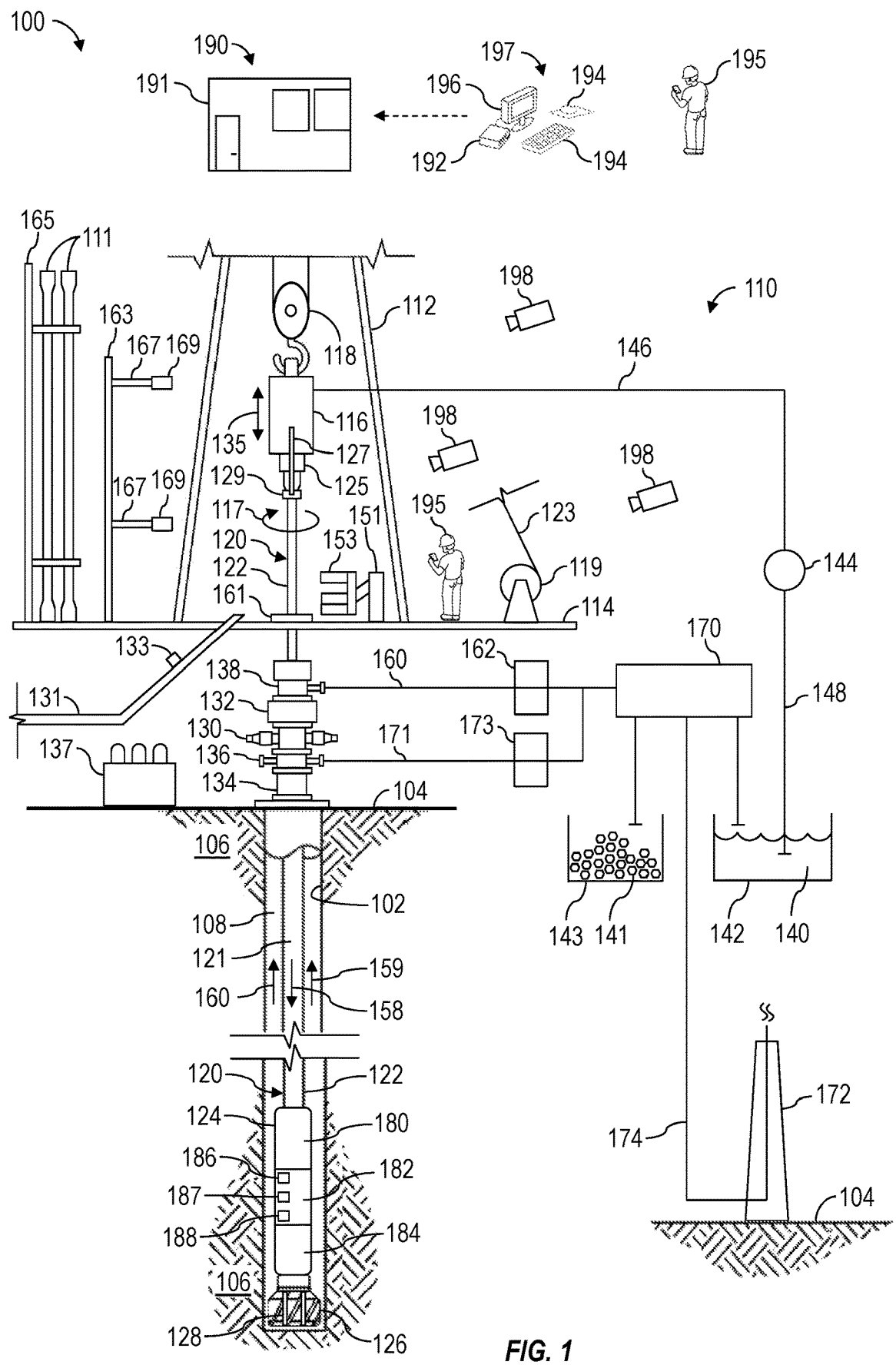
FIG. 1 is a schematic view of at least a portion of an example implementation of apparatus according to one or more aspects of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for simplicity and clarity, and does not in itself dictate a relationship between the various embodiments and/or configurations discussed.

FIG. 1 is a schematic view of at least a portion of an example implementation of a well construction system 100 according to one or more aspects of the present disclosure. The well construction system 100 represents an example environment in which one or more aspects of the present disclosure described below may be implemented. Although the well construction system 100 is depicted as an onshore implementation, the aspects described below are also applicable to offshore implementations.

The well construction system 100 is depicted in relation to a wellbore 102 formed by rotary and/or directional drilling from a wellsite surface 104 and extending into a subterranean formation 106. The well construction system 100 includes surface equipment 110 located at the wellsite surface 104 and a drill string 120 suspended within the wellbore 102. The surface equipment 110 may include a mast, a derrick, and/or another support structure 112 disposed over a rig floor 114. The drill string 120 may be suspended within the wellbore 102 from the support structure 112. The support structure 112 and the rig floor 114 are collectively supported over the wellbore 102 by legs and/or other support structures (not shown).

The drill string 120 may comprise a bottom-hole assembly (BHA) 124 and means 122 for conveying the BHA 124 within the wellbore 102. The conveyance means 122 may comprise drill pipe, heavy-weight drill pipe (HWDP), wired drill pipe (WDP), tough logging condition (TLC) pipe, coiled tubing, and/or other means for conveying the BHA 124 within the wellbore 102. A downhole end of the BHA 124 may include or be coupled to a drill bit 126. Rotation of the drill bit 126 and the weight of the drill string 120 collectively operate to form the wellbore 102. The drill bit 126 may be rotated from the wellsite surface 104 and/or via a downhole mud motor (not shown) connected with the drill bit 126.

The BHA 124 may also include various downhole tools 180, 182, 184. One or more of such downhole tools 180, 182, 184 may be or comprise an acoustic tool, a density tool, a directional drilling tool, an electromagnetic (EM) tool, a formation sampling tool, a formation testing tool, a gravity tool, a monitoring tool, a neutron tool, a nuclear tool, a photoelectric factor tool, a porosity tool, a reservoir characterization tool, a resistivity tool, a rotational speed sensing tool, a sampling-while-drilling (SWD) tool, a seismic tool, a surveying tool, a torsion sensing tool, and/or other measuring-while-drilling (MWD) or logging-while-drilling (LWD) tools.

One or more of the downhole tools 180, 182, 184 may be or comprise an MWD or LWD tool comprising a sensor package 186 operable for the acquisition of measurement data pertaining to the BHA 124, the wellbore 102, and/or the formation 106. One or more of the downhole tools 180, 182, 184 and/or another portion of the BHA 124 may also comprise a telemetry device 187 operable for communication with the surface equipment 110, such as via mud-pulse telemetry. One or more of the downhole tools 180, 182, 184 and/or another portion of the BHA 124 may also comprise a downhole processing device 188 operable to receive, process, and/or store information received from the surface equipment 110, the sensor package 186, and/or other portions of the BHA 124. The processing device 188 may also store executable computer programs (e.g., program code instructions), including for implementing one or more aspects of the operations described herein.

The support structure 112 may support a driver, such as a top drive 116, operable to connect (perhaps indirectly) with an uphole end of the conveyance means 122, and to impart rotary motion 117 and vertical motion 135 to the drill string 120 and the drill bit 126. However, another driver, such as a kelly and rotary table (neither shown), may be utilized instead of or in addition to the top drive 116 to impart the rotary motion 117. The top drive 116 and the connected drill string 120 may be suspended from the support structure 112 via hoisting equipment, which may include a traveling block 118, a crown block (not shown), and a draw works 119 storing a support cable or line 123. The crown block may be connected to or otherwise supported by the support structure 112, and the traveling block 118 may be coupled with the top drive 116, such as via a hook. The draw works 119 may be mounted on or otherwise supported by the rig floor 114. The crown block and traveling block 118 comprise pulleys or sheaves around which the support line 123 is reeved to operatively connect the crown block, the traveling block 118, and the draw works 119 (and perhaps an anchor). The draw works 119 may thus selectively impart tension to the support line 123 to lift and lower the top drive 116, resulting in the vertical motion 135. The draw works 119 may comprise a drum, a frame, and a prime mover (e.g., an engine or motor) (not shown) operable to drive the drum to rotate and reel in the support line 123, causing the traveling block 118 and the top drive 116 to move upward. The draw works 119 may be operable to release the support line 123 via a controlled rotation of the drum, causing the traveling block 118 and the top drive 116 to move downward.

The top drive 116 may comprise a grabber, a swivel (neither shown), a tubular handling assembly links 127 terminating with an elevator 129, and a drive shaft 125 operatively connected with a prime mover (not shown), such as via a gear box or transmission (not shown). The drill string 120 may be mechanically coupled to the drive shaft 125 with or without a sub saver between the drill string 120 and the drive shaft 125. The prime mover may be selectively operated to rotate the drive shaft 125 and the drill string 120 coupled with the drive shaft 125. Hence, during drilling operations, the top drive 116 in conjunction with operation of the draw works 119 may advance the drill string 120 into the formation 106 to form the wellbore 102. The tubular handling assembly links 127 and the elevator 129 of the top drive 116 may handle tubulars (e.g., drill pipes, drill collars, casing joints, etc.) that are not mechanically coupled to the drive shaft 125. For example, when the drill string 120 is being tripped into or out of the wellbore 102, the elevator 129 may grasp the tubulars of the drill string 120 such that the tubulars may be raised and/or lowered via the hoisting equipment mechanically coupled to the top drive 116. The grabber may include a clamp that clamps onto a tubular when making up and/or breaking out a connection of a tubular with the drive shaft 125. The top drive 116 may have a guide system (not shown), such as rollers that track up and down a guide rail on the support structure 112. The guide system may aid in keeping the top drive 116 aligned with the wellbore 102, and in preventing the top drive 116 from rotating during drilling by transferring reactive torque to the support structure 112.

The well construction system 100 may further include a well control system for maintaining well pressure control. For example, the drill string 120 may be conveyed within the wellbore 102 through various blowout preventer (BOP) equipment disposed at the wellsite surface 104 on top of the wellbore 102 and perhaps below the rig floor 114. The BOP equipment may be operable to control pressure within the wellbore 102 via a series of pressure barriers (e.g., rams) between the wellbore 102 and the wellsite surface 104. The BOP equipment may include a BOP stack 130, an annular preventer 132, and/or a rotating control device (RCD) 138 mounted above the annular preventer 132. The BOP equipment 130, 132, 138 may be mounted on top of a wellhead 134. The well control system may further include a BOP control unit 137 (i.e., a BOP closing unit) operatively connected with the BOP equipment 130, 132, 138 and operable to actuate, drive, operate or otherwise control the BOP equipment 130, 132, 138. The BOP control unit 137 may be or comprise a hydraulic fluid power unit fluidly connected with the BOP equipment 130, 132, 138 and selectively operable to hydraulically drive various portions (e.g., rams, valves, seals) of the BOP equipment 130, 132, 138.

The well construction system 100 may further include a drilling fluid circulation system operable to circulate fluids between the surface equipment 110 and the drill bit 126 during drilling and other operations. For example, the drilling fluid circulation system may be operable to inject a drilling fluid from the wellsite surface 104 into the wellbore 102 via an internal fluid passage 121 extending longitudinally through the drill string 120. The drilling fluid circulation system may comprise a pit, a tank, and/or other fluid container 142 holding the drilling fluid (i.e., mud) 140, and a pump 144 operable to move the drilling fluid 140 from the container 142 into the fluid passage 121 of the drill string 120 via a fluid conduit 146 extending from the pump 144 to the top drive 116 and an internal passage extending through the top drive 116. The fluid conduit 146 may comprise one or more of a pump discharge line, a stand pipe, a rotary hose, and a gooseneck (not shown) connected with a fluid inlet of the top drive 116. The pump 144 and the container 142 may be fluidly connected by a fluid conduit 148, such as a suction line.

During drilling operations, the drilling fluid may continue to flow downhole through the internal passage 121 of the drill string 120, as indicated by directional arrow 158. The drilling fluid may exit the BHA 124 via ports 128 in the drill bit 126 and then circulate uphole through an annular space 108 ("annulus") of the wellbore 102 defined between an exterior of the drill string 120 and the wall of the wellbore 102, such flow being indicated by directional arrows 159. In this manner, the drilling fluid lubricates the drill bit 126 and carries formation cuttings uphole to the wellsite surface 104. The returning drilling fluid may exit the annulus 108 via the RCD 138 and/or via a spool, a wing valve, a bell nipple, or another ported adapter 136, which may be located below one or more portions of the BOP stack 130.

The drilling fluid exiting the annulus 108 via the RCD 138 may be directed into a fluid conduit 160 (e.g., a drilling pressure control line), and may pass through various wellsite equipment fluidly connected along the conduit 160 prior to being returned to the container 142 for recirculation. For example, the drilling fluid may pass through a choke manifold 162 (e.g., a drilling pressure control choke manifold) connected along the conduit 160. The choke manifold 162 may include at least one choke and a plurality of fluid valves (neither shown) collectively operable to control the flow through and out of the choke manifold 162. Backpressure may be applied to the annulus 108 by variably restricting flow of the drilling fluid or other fluids flowing through the choke manifold 162. The greater the restriction to flow through the choke manifold 162, the greater the backpressure applied to the annulus 108.

The drilling fluid may also or instead exit the annulus 108 via the ported adapter 136 and into a fluid conduit 171 (e.g., rig choke line), and may pass through various equipment fluidly connected along the conduit 171 prior to being returned to the container 142 for recirculation. For example, the drilling fluid may pass through a choke manifold 173 (e.g., a rig choke manifold) connected along the conduit 171. The choke manifold 173 may include at least one choke and a plurality of fluid valves (neither shown) collectively operable to control the flow through the choke manifold 173. Backpressure may be applied to the annulus 108 by variably restricting flow of the drilling fluid or other fluids flowing through the choke manifold 173.

Before being returned to the container 142, the drilling fluid returning to the wellsite surface 104 may be cleaned and/or reconditioned via drilling fluid reconditioning equipment 170, which may include one or more of liquid gas separators, shale shakers, centrifuges, and other drilling fluid cleaning equipment. The liquid gas separators may remove formation gasses entrained in the drilling fluid discharged from the wellbore 102 and the shale shakers may separate and remove solid particles 141 (e.g., drill cuttings) from the drilling fluid. The drilling fluid reconditioning equipment 170 may further comprise equipment operable to remove additional gas and finer formation cuttings from the drilling fluid and/or modify physical properties or characteristics (e.g., rheology) of the drilling fluid. For example, the drilling fluid reconditioning equipment 170 may include a degasser, a desander, a desilter, a mud cleaner, and/or a decanter, among other examples. Intermediate tanks/containers (not shown) may be utilized to hold the drilling fluid while the drilling fluid progresses through the various stages or portions of the drilling fluid reconditioning equipment 170. The cleaned/reconditioned drilling fluid may be transferred to the fluid container 142, the solid particles 141 removed from the drilling fluid may be transferred to a solids container 143 (e.g., a reserve pit), and/or the removed gas may be transferred to a flare stack 172 via a conduit 174 (e.g., a flare line) to be burned or to a container (not shown) for storage and removal from the wellsite.

The surface equipment 110 may include tubular handling equipment operable to store, move, connect, and disconnect tubulars (e.g., drill pipes) to assemble and disassemble the conveyance means 122 of the drill string 120 during drilling operations. For example, a catwalk 131 may be utilized to convey tubulars from a ground level, such as along the wellsite surface 104, to the rig floor 114, permitting the tubular handling assembly links 127 to grab and lift the tubulars above the wellbore 102 for connection with previously deployed tubulars. The catwalk 131 may have a horizontal portion and an inclined portion that extends between the horizontal portion and the rig floor 114. The catwalk 131 may comprise a skate 133 movable along a groove (not shown) extending longitudinally along the horizontal and inclined portions of the catwalk 131. The skate 133 may be operable to convey (e.g., push) the tubulars along the catwalk 131 to the rig floor 114. The skate 133 may be driven along the groove by a drive system (not shown), such as a pulley system or a hydraulic system. Additionally, one or more racks (not shown) may adjoin the horizontal portion of the catwalk 131. The racks may have a spinner unit for transferring tubulars to the groove of the catwalk 131.

An iron roughneck 151 may be positioned on the rig floor 114. The iron roughneck 151 may comprise a torqueing portion 153, such as may include a spinner and a torque wrench comprising a lower tong and an upper tong. The torqueing portion 153 of the iron roughneck 151 may be moveable toward and at least partially around the drill string 120, such as may permit the iron roughneck 151 to make up and break out connections of the drill string 120. The torqueing portion 153 may also be moveable away from the drill string 120, such as may permit the iron roughneck 151 to move clear of the drill string 120 during drilling operations. The spinner of the iron roughneck 151 may be utilized to apply low torque to make up and break out threaded connections between tubulars of the drill string 120, and the torque wrench may be utilized to apply a higher torque to tighten and loosen the threaded connections.

Reciprocating slips 161 may be located on the rig floor 114, such as may accommodate therethrough the downhole tubulars during make up and break out operations and during the drilling operations. The reciprocating slips 161 may be in an open position during drilling operations to permit advancement of the drill string 120 therethrough, and in a closed position to clamp an upper end of the conveyance means 122 (e.g., assembled tubulars) to thereby suspend and prevent advancement of the drill string 120 within the wellbore 102, such as during the make up and break out operations.

During drilling operations, the hoisting equipment lowers the drill string 120 while the top drive 116 rotates the drill string 120 to advance the drill string 120 downward within the wellbore 102 and into the formation 106. During the advancement of the drill string 120, the reciprocating slips 161 are in an open position, and the iron roughneck 151 is moved away or is otherwise clear of the drill string 120. When the upper portion of the tubular in the drill string 120 that is made up to the drive shaft 125 is near the reciprocating slips 161 and/or the rig floor 114, the top drive 116 ceases rotating and the reciprocating slips 161 close to clamp the tubular made up to the drive shaft 125. The grabber of the top drive 116 then clamps the upper portion of the tubular made up to the drive shaft 125, and the drive shaft 125 rotates in a direction reverse from the drilling rotation to break out the connection between the drive shaft 125 and the made up tubular. The grabber of the top drive 116 may then release the tubular of the drill string 120.

Multiple tubulars may be loaded on the rack of the catwalk 131 and individual tubulars (or stands of two or three tubulars) may be transferred from the rack to the groove in the catwalk 131, such as by the spinner unit. The tubular positioned in the groove may be conveyed along the groove by the skate 133 until an end of the tubular projects above the rig floor 114. The elevator 129 of the top drive 116 then grasps the protruding end, and the draw works 119 is operated to lift the top drive 116, the elevator 129, and the new tubular.

The hoisting equipment then raises the top drive 116, the elevator 129, and the tubular until the tubular is aligned with the upper portion of the drill string 120 clamped by the slips 161. The iron roughneck 151 is moved toward the drill string 120, and the lower tong of the torqueing portion 153 clamps onto the upper portion of the drill string 120. The spinning system rotates the new tubular (e.g., a threaded male end) into the upper portion of the drill string 120 (e.g., a threaded female end). The upper tong then clamps onto the new tubular and rotates with high torque to complete making up the connection with the drill string 120. In this manner, the new tubular becomes part of the drill string 120. The iron roughneck 151 then releases and moves clear of the drill string 120.

The grabber of the top drive 116 may then clamp onto the drill string 120. The drive shaft 125 (e.g., a threaded male end) is brought into contact with the drill string 120 (e.g., a threaded female end) and rotated to make up a connection between the drill string 120 and the drive shaft 125. The grabber then releases the drill string 120, and the reciprocating slips 161 are moved to the open position. The drilling operations may then resume.

The tubular handling equipment may further include a pipe handling manipulator (PHM) 163 disposed in association with a fingerboard 165. Although the PHM 163 and the fingerboard 165 are shown supported on the rig floor 114, one or both of the PHM 163 and fingerboard 165 may be located on the wellsite surface 104 or another area of the well construction system 100. The fingerboard 165 provides storage (e.g., temporary storage) of tubulars (or stands of two or three tubulars) 111 during various operations, such as during and between tripping out and tripping in the drill string 120. The PHM 163 may be operable to transfer the tubulars 111 between the fingerboard 165 and the drill string 120 (i.e., space above the suspended drill string 120). For example, the PHM 163 may include arms 167 terminating with clamps 169, such as may be operable to grasp and/or clamp onto one of the tubulars 111. The arms 167 of the PHM 163 may extend and retract, and/or at least a portion of the PHM 163 may be rotatable and/or movable toward and away from the drill string 120, such as may permit the PHM 163 to transfer the tubular 111 between the fingerboard 165 and the drill string 120.

To trip out the drill string 120, the top drive 116 is raised, the reciprocating slips 161 are closed around the drill string 120, and the elevator 129 is closed around the drill string 120. The grabber of the top drive 116 clamps the upper portion of the tubular made up to the drive shaft 125. The drive shaft 125 then rotates in a direction reverse from the drilling rotation to break out the connection between the drive shaft 125 and the drill string 120. The grabber of the top drive 116 then releases the tubular of the drill string 120, and the drill string 120 is suspended by (at least in part) the elevator 129. The iron roughneck 151 is moved toward the drill string 120. The lower tong clamps onto a lower tubular below a connection of the drill string 120, and the upper tong clamps onto an upper tubular above that connection. The upper tong then rotates the upper tubular to provide a high torque to break out the connection between the upper and lower tubulars. The spinning system then rotates the upper tubular to separate the upper and lower tubulars, such that the upper tubular is suspended above the rig floor 114 by the elevator 129. The iron roughneck 151 then releases the drill string 120 and moves clear of the drill string 120.

The PHM 163 may then move toward the drill string 120 to grasp the tubular suspended from the elevator 129. The elevator 129 then opens to release the tubular. The PHM 163 then moves away from the drill string 120 while grasping the tubular with the clamps 169, places the tubular in the fingerboard 165, and releases the tubular for storage in the fingerboard 165. This process is repeated until the intended length of drill string 120 is removed from the wellbore 102.

The surface equipment 110 of the well construction system 100 may also comprise a control center 190 from which various portions of the well construction system 100, such as the top drive 116, the hoisting system, the tubular handling system, the drilling fluid circulation system, the well control system, the BHA 124, among other examples, may be monitored and controlled. The control center 190 may be located on the rig floor 114 or another location of the well construction system 100, such as the wellsite surface 104. The control center 190 may comprise a facility 191 (e.g., a room, a cabin, a trailer, etc.) containing a control workstation 197, which may be operated by a human wellsite operator 195 to monitor and control various wellsite equipment or portions of the well construction system 100. The control workstation 197 may comprise or be communicatively connected with a processing device 192 (e.g., a controller, a computer, etc.), such as may be operable to receive, process, and output information to monitor operations of and provide control to one or more portions of the well construction system 100. For example, the processing device 192 may be communicatively connected with the various surface and downhole equipment described herein, and may be operable to receive signals from and transmit signals to such equipment to perform various operations described herein. The processing device 192 may store executable program code, instructions, and/or operational parameters or set-points, including for implementing one or more aspects of methods and operations described herein. The processing device 192 may be located within and/or outside of the facility 191.

The control workstation 197 may be operable for entering or otherwise communicating control commands to the processing device 192 by the wellsite operator 195, and for displaying or otherwise communicating information from the processing device 192 to the wellsite operator 195. The control workstation 197 may comprise a plurality of human-machine interface (HMI) devices, including one or more input devices 194 (e.g., a keyboard, a mouse, a joystick, a touchscreen, etc.) and one or more output devices 196 (e.g., a video monitor, a touchscreen, a printer, audio speakers, etc.). Communication between the processing device 192, the input and output devices 194, 196, and the various wellsite equipment may be via wired and/or wireless communication means. However, for clarity and ease of understanding, such communication means are not depicted, and a person having ordinary skill in the art will appreciate that such communication means are within the scope of the present disclosure.

Well construction systems within the scope of the present disclosure may include more or fewer components than as described above and depicted in FIG. 1. Additionally, various equipment and/or subsystems of the well construction system 100 shown in FIG. 1 may include more or fewer components than as described above and depicted in FIG. 1. For example, various engines, motors, hydraulics, actuators, valves, and/or other components not explicitly described herein may be included in the well construction system 100, and are within the scope of the present disclosure.

The well construction system 100 also includes stationary and/or mobile video cameras 198 disposed or utilized at various locations within the well construction system 100. The video cameras 198 capture videos of various portions, equipment, or subsystems of the well construction system 100, and perhaps the wellsite operators 195 and the actions they perform, during or otherwise in association with the wellsite operations, including while performing repairs to the well construction system 100 during a breakdown. For example, the video cameras 198 may capture digital images (or video frames) of the entire well construction system 100 and/or specific portions of the well construction system 100, such as the top drive 116, the iron roughneck 151, the PHM 163, the fingerboard 165, and/or the catwalk 131, among other examples. The video cameras 198 generate corresponding video signals (i.e., feeds) comprising or otherwise indicative of the captured digital images. The video cameras 198 may be in signal communication with the processing device 192, such as may permit the video signals to be processed and transmitted to the control workstation 197 and, thus, permit the wellsite operators 195 to view various portions or components of the well construction system 100 on one or more of the output devices 196. The processing device 192 or another portion of the control workstation 197 may be operable to record the video signals generated by the video cameras 198.

Figure 2:
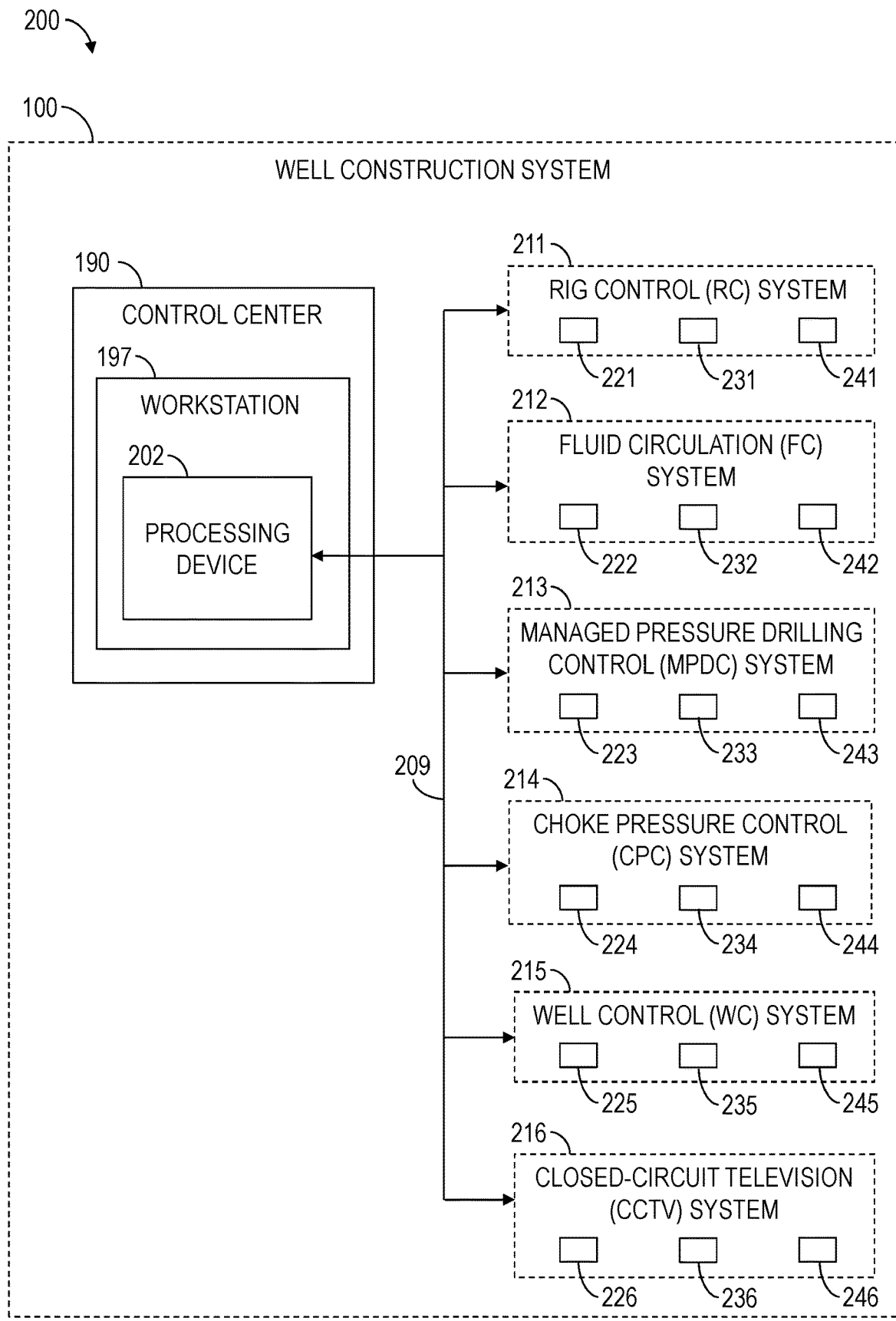
FIG. 2 is a schematic view of at least a portion of an example implementation of apparatus according to one or more aspects of the present disclosure.

The present disclosure further provides various implementations of systems and/or methods for controlling one or more portions of the well construction system 100. FIG. 2 is a schematic view of at least a portion of an example implementation of a monitoring and control system 200 for monitoring and controlling various equipment, portions, and subsystems of the well construction system 100 according to one or more aspects of the present disclosure. The following description refers to FIGS. 1 and 2, collectively.

The control system 200 may be in real-time communication with and utilized to monitor and/or control various portions, components, and equipment of the well construction system 100 described herein. The equipment of the well construction system 100 may be grouped into several subsystems, each operable to perform a corresponding operation and/or a portion of the well construction operations described herein. The subsystems may include a rig control (RC) system 211, a fluid circulation (FC) system 212, a managed pressure drilling control (MPDC) system 213, a choke pressure control (CPC) system 214, a well pressure control (WC) system 215, and a closed-circuit television (CCTV) system 216. The control workstation 197 may be utilized to monitor, configure, control, and/or otherwise operate one or more of the well construction subsystems 211-216.

The RC system 211 may include the support structure 112, the drill string hoisting system or equipment (e.g., the draw works 119 and the top drive 116), drill string drivers (e.g., the top drive 116 and/or the rotary table and kelly), the reciprocating slips 161, the drill pipe handling system or equipment (e.g., the catwalk 131, the PHM 163, the fingerboard 165, and the iron roughneck 151), electrical generators, and other equipment. Accordingly, the RC system 211 may perform power generation and drill pipe handling, hoisting, and rotation operations. The RC system 211 may also serve as a support platform for drilling equipment and staging ground for rig operations, such as connection make up and break out operations described above. The FC system 212 may include the drilling fluid 140, the pumps 144, drilling fluid loading equipment, the drilling fluid reconditioning equipment 170, the flare stack 172, and/or other fluid control equipment. Accordingly, the FC system 212 may perform fluid operations of the well construction system 100. The MPDC system 213 may include the RCD 138, the choke manifold 162, downhole pressure sensors 186, and/or other equipment. The CPC system 214 may comprise the choke manifold 173, and/or other equipment, and the WC system 215 may comprise the BOP equipment 130, 132, 138, the BOP control unit 137, and a BOP control station (not shown) for controlling the BOP control unit 137. The CCTV system 216 may include the video cameras 198 and corresponding actuators (e.g., motors) for moving or otherwise controlling direction of the video cameras 198. The CCTV system 216 may be utilized to capture real-time video of various portions or subsystems 211-215 of the well construction system 100 and display video signals from the video cameras 198 on the video output devices 196 to display in real-time the various portions or subsystems 211-215. Each of the well construction subsystems 211-216 may further comprise various communication equipment (e.g., modems, network interface cards, etc.) and communication conductors (e.g., cables), communicatively connecting the equipment (e.g., sensors and actuators) of each subsystem 211-216 with the control workstation 197 and/or other equipment. Although the wellsite equipment listed above and shown in FIG. 1 is associated with certain wellsite subsystems 211-216, such associations are merely examples that are not intended to limit or prevent such wellsite equipment from being associated with two or more wellsite subsystems 211-216 and/or different wellsite subsystems 211-216.

The control system 200 may also include various local controllers 221-226 associated with corresponding subsystems 211-216 and/or individual pieces of equipment of the well construction system 100. As described above, each well construction subsystem 211-216 includes various wellsite equipment comprising corresponding actuators 241-246 for performing operations of the well construction system 100. Each subsystem 211-216 further includes various sensors 231-236 operable to generate sensor data indicative of operational performance and/or status of the wellsite equipment of each subsystem 211-216. Although the sensors 231-236 and actuators 241-246 are each shown as a single block, it is to be understood that each sensor 231-236 and actuator 241-246 may be or comprise a plurality of sensors and actuators, whereby each actuator performs a corresponding action of a piece of equipment or subsystem 211-216 and each sensor generates corresponding sensor data indicative of the action performed by a corresponding actuator or of other operational parameter of the piece of equipment or subsystem 211-216.

The local controllers 221-226, the sensors 231-236, and the actuators 241-246 may be communicatively connected with a processing device 202. For example, the local controllers may be in communication with the sensors 231-236 and actuators 241-246 of the corresponding subsystems 211-216 via local communication networks (e.g., field buses, not shown) and the processing device 202 may be in communication with the subsystems 211-216 via a communication network 209 (e.g., data bus, a wide-area-network (WAN), a local-area-network (LAN), etc.). The sensor data (e.g., electronic signals, information, and/or measurements, etc.) generated by the sensors 231-236 of the subsystems 211-216 may be made available for use by processing device 202 and/or the local controllers 221-226. Similarly, control commands (e.g., signals, information, etc.) generated by the processing device 202 and/or the local controllers 221-226 may be automatically communicated to the various actuators 241-246 of the subsystems 211-216, perhaps pursuant to predetermined programming, such as to facilitate well construction operations and/or other operations described herein. The processing device 202 may be or comprise the processing device 192 shown in FIG. 1. Accordingly, the processing device 202 may be communicatively connected with or form a portion of the workstation 197 and/or may be at least partially located within the control center 190.

The sensors 231-236 and actuators 241-246 may be monitored and/or controlled by the processing device 202. For example, the processing device 202 may be operable to receive the sensor data from the sensors 231-236 of the wellsite subsystems 211-216 in real-time, and to provide real-time control commands to the actuators 241-246 of the subsystems 211-216 based on the received sensor data. However, certain operations of the actuators 241-246 may be controlled by the local controllers 221-226, which may control the actuators 241-246 based on sensor data received from the sensors 231-236 and/or based on control commands received from the processing device 202.

The processing devices 188, 192, 202, the local controllers 221-226, and other controllers or processing devices of the well construction system 100 may be operable to receive program code instructions and/or sensor data from sensors (e.g., sensors 231-236), process such information, and/or generate control commands to operate controllable equipment (e.g., actuators 241-246) of the well construction system 100. Accordingly, the processing devices 188, 192, 202, the local controllers 221-226, and other controllers or processing devices of the well construction system 100 may individually or collectively be referred to hereinafter as equipment controllers. Equipment controllers within the scope of the present disclosure can include, for example, programmable logic controllers (PLCs), industrial computers (IPCs), personal computers (PCs), soft PLCs, variable frequency drives (VFDs) and/or other controllers or processing devices operable to receive sensor data and/or control commands and cause operation of controllable equipment based on such sensor data and/or control commands.

The various pieces of wellsite equipment described above and shown in FIGS. 1 and 2 may each comprise one or more hydraulic and/or electrical actuators, which when actuated, may cause corresponding components or portions of the piece of equipment to perform intended actions (e.g., work, tasks, movements, operations, etc.). Each piece of equipment may further comprise a plurality of sensors, whereby one or more sensors may be associated with a corresponding actuator or another component of the piece of equipment and communicatively connected with an equipment controller. Each sensor may be operable to generate sensor data (e.g., electrical sensor signals or measurements) indicative of an operational (e.g., mechanical, physical) status of the corresponding actuator or component, thereby permitting the operational status of the actuator to be monitored by the equipment controller. The sensor data may be utilized by the equipment controller as feedback data, permitting operational control of the piece of equipment and coordination with other equipment. Such sensor data may be indicative of performance of each individual actuator and, collectively, of the entire piece of wellsite equipment.

The present disclosure is further directed to performance based condition monitoring, which utilizes sensor data indicative of actions performed or otherwise caused by actuators of a piece of wellsite equipment to generate performance based condition indicators, which in turn, may be utilized as a basis for determining condition (e.g., operational health, operational life, maintenance condition, etc.) of the piece of wellsite equipment. Performance based condition indicators may be indicative of condition of each actuator and/or other components facilitating each action performed by the piece of equipment. Performance based condition indicators may be utilized as a basis for predicting developing faults (i.e., operational problems, breakdowns, failures) before such faults have manifested themselves through visual and/or physical detection by a wellsite operator or a full stop (i.e., failure) of the wellsite equipment. When a fault has progressed to a point at which it is detectable via audible noise or excessive temperature (e.g., too hot to touch), the equipment is approaching point of failure.

Performance based condition monitoring according to one or more aspects of the present disclosure utilizes a bottom-up approach, which focuses on sensor data indicative of detailed operational parameters (e.g., physical states) of individual actuators or other components causing or otherwise associated with each action performed by a piece of equipment. The sensor data may then be utilized to predict or determine the condition of the piece of wellsite equipment. For example, the performance based condition monitoring may include recording sensor data for each sensor, actuator, and/or action of a piece of equipment, and analyzing or otherwise processing such sensor data to generate performance based condition indicators to predict or determine condition of the piece of equipment. Performance based condition indicators may be calculated or otherwise generated based on sensor data indicative of physical states during each action caused, performed, or otherwise facilitated by a corresponding actuator or another part of a piece of wellsite equipment. Performance based condition monitoring according to one or more aspects of the present disclosure may also consolidate the sensor data by generating the performance based condition indicators associated with a piece of wellsite equipment.

Figure 3:
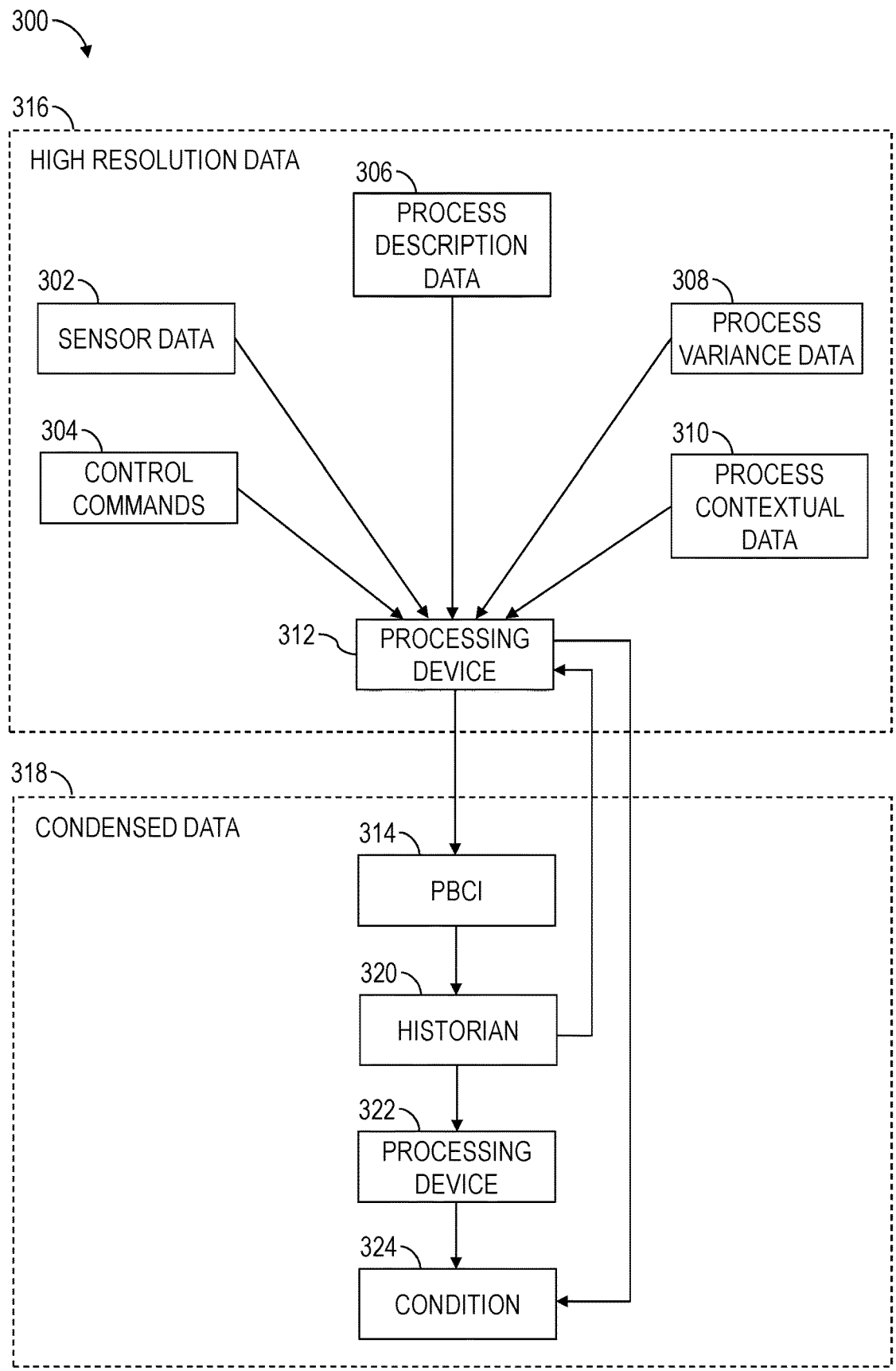
FIG. 3 is a flow-chart diagram of at least a portion of a process according to one or more aspects of the present disclosure.

Performance based condition indicators may also be determined based on additional condition monitoring data indicative of other operational parameters, factors, conditions, characteristics, and descriptions related to a piece of wellsite equipment and the operations such wellsite equipment performs. FIG. 3 is a flow-chart diagram showing an example implementation of a performance based condition monitoring process 300 according to one or more aspects of the present disclosure.

The condition monitoring data may include sensor data 302, control commands 304, process description data 306, process variance data 308, and process contextual data 310. As described above, sensor data 302 may be indicative of physical states of an actuator or another component of a piece of equipment during an action that was caused, performed, or otherwise facilitated by the actuator or another component. The sensor data may be indicative of different points of measurement of the action performed. The sensor data may include, for example, position of a hydraulic cylinder or motor, hydraulic fluid pressure, pressure within an accumulator, flow generated by a pump, force generated by an actuator, and temperature of hydraulic fluid.

Performance based condition indicators may also be calculated based on control commands (e.g., control signals, sequence steps, control functions, etc.) generated or outputted by equipment controllers to the individual actuators of the wellsite equipment triggering or causing the intended actions. Use of control commands highlights performance of the actuators in the overall process efficiency, thereby treating the actuator performance independently of operator or process parameters. The sensor signals may be compared to the control commands to determine differences in performance between an action that was intended, as indicated by the control commend, and an action that was actually executed, as indicated by the sensor signal. Control commands may initiate the action. Control commands may include, for example, control signals that are transmitted by an equipment controller (e.g., processing devices 192, 202 and local controllers 221-226 shown in FIGS. 1 and 2) to a mechanical controller, such as a hydraulic valve, to operate a hydraulic actuator, or an electrical controller, such as a relay or VFD, to operate an electrical actuator. Process description data 306 may be descriptive or otherwise indicative of an individual action performed by a piece of wellsite equipment and defined by the sensor data. Process description data 306 may include, for example, extension of a top drive dolly, charging of hydraulic accumulators, rotation of a draw works drum, and extension of racker main arm. Process variance data 308 may be indicative of changed conditions or other factors associated with a piece of equipment that can influence or skew the sensor data while an action is performed. Process variance data 308 may be indicative of, for example, weight of a gripper head, cylinder pressure, hydraulic fluid supply pressure, hydraulic fluid temperature, ambient temperature, speed reference, position reference, equipment controller deviation, and control joystick position. Process contextual data 310 may be or comprise factors that can cause the sensor data associated with an action to be inaccurate. Process contextual data 310 may be or comprise, for example, automatic sequence step, operational mode, trolley position, pipe data, slew position, main arm vertical position, hydraulic position deviation, weight cell reference, weight cell deviation, tubular interlock messages, zone management messages, operation messages, warnings, and alarms.

As further shown in FIG. 3, the condition monitoring data 302, 304, 306, 308, 310 may be received and processed by a processing device 312, which may generate performance based condition indicators 314 based on the condition monitoring data. During operations of a piece of equipment, control commands 304 may be transmitted from an equipment controller to a mechanical/electrical controller to operate an actuator, thereby triggering or initiating an action. While the action is performed, the control commands 304 and the sensor data 302 may be received by the processing device 312. The process description data 306, the process variance data 308, and process contextual data 310 may also be received by the processing device 312 while the action is performed. The condition monitoring data 306, 308, 310 may be generated by an equipment controller operating the piece of equipment, other sensors associated with the piece of equipment, and/or from wellsite operators. The process variance data 308 may be indicative of changed conditions or other factors that can influence the actions performed by the piece of equipment and, thereby, skew, shift, introduce noise, or otherwise change the sensor data 302. Accordingly, process variance data 308 may be utilized by the processing device 312 to shift sensor data 302 that was changed by the process variance data 308 to compensate for the changes in the sensor data 302. Process contextual data 310 may be indicative of, for example, a change of state or condition of the piece of equipment that renders sensor data 302 invalid. Process contextual data 310 may, thus, be utilized by the processing device 312 to invalidate certain sensor data 302 that may be affected by the state or condition of the piece of equipment. Accordingly, validated sensor data 302 may be processed by the processing device 312 to generate (e.g., calculate) the performance based condition indicators 314, and invalidated sensor data 302 may not be utilized (e.g., may be disregarded) by the processing device 312 as a basis for generating the performance based condition indicators 314. Example performance based condition indicators 314 generated by the processing device 312 may comprise, for example, travel time, acceleration, mean velocity, maximum velocity, control command deviation (variance), control command deviation (amplitude), utilization spectrum, and exposure spectrum, among other examples.

The condition monitoring data 302, 304, 306, 308, 310 may be generated in real-time at high sampling rates and, thus, be or comprise high resolution data 316 using a high bandwidth data transmission and/or processing. The performance based condition indicators 314 generated by the processing device 312 is or comprises a single measurement, as opposed to five measurements that include the condition monitoring data 302, 304, 306, 308, 310. Furthermore, the performance based condition indicators 314 may be calculated by the processing device 312 at lower frequencies than the sampling rates of the condition monitoring data 302, 304, 306, 308, 310. The performance based condition indicators 314 may, thus, be or comprise condensed (lower resolution) data 318, permitting low bandwidth data transmission and/or processing.

The performance based condition indicators 314 may be transmitted to and stored in a historian 320 (e.g., database, data storage center). The historian 320 may be located at the wellsite or at a location remote from the wellsite. Current and historical performance based condition indicators 314 may be analyzed systematically or in real-time over a period of time by the processing device 312 at the wellsite or another processing device 322 located remotely from the wellsite. The processing device 312 and/or processing device 322 may process the current and historical performance based condition indicators 314 to recognize changes or trends in performance (e.g., performance quality degradation) of individual actuators or components. Such trends may be indicative of developing or potential faults, which may be repaired or otherwise addressed before failure or large reductions in performance can manifest. When at least one of the performance based condition indicators 314 falls below a predetermined threshold, the processing device 312 and/or processing device 322 may then generate or output condition information 324 indicative of health of the piece of equipment. The processing device 312 and/or processing device 322 may comprise or store computer program code, which when executed by the processing devices 312, 322 may generate, calculate, or output the performance based condition indicators 314 and/or the condition information 324 based on the performance based condition indicators 314. The computer program code may be or comprise modeling or predictive processes, engines, algorithms, applications, and/or other programs operable to predict or determine condition of a piece of equipment and/or one or more of its components.

Figure 4:
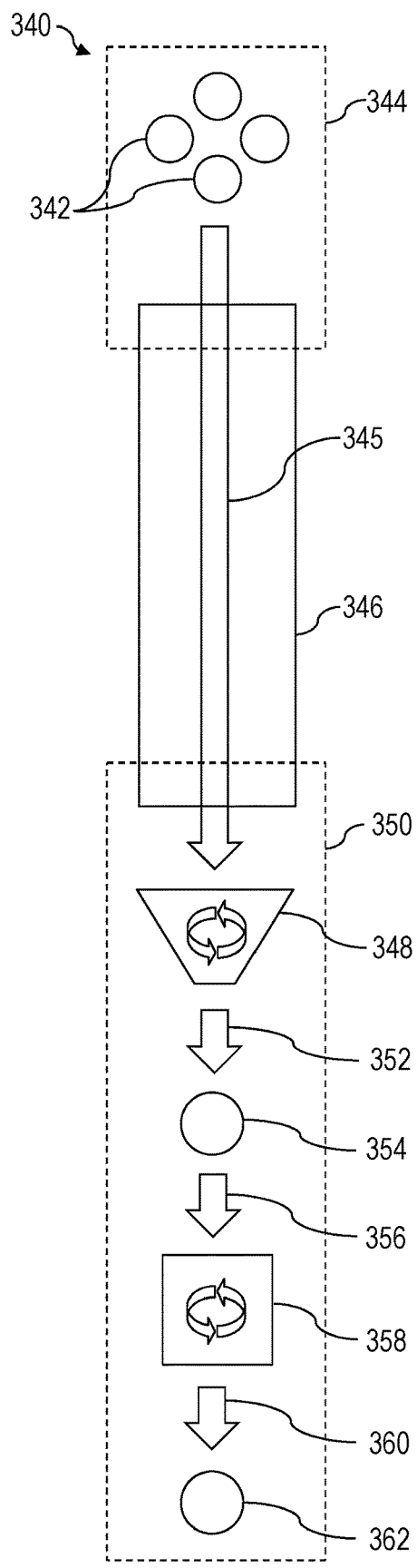
FIG. 4 is a flow-chart diagram of at least a portion of a process according to one or more aspects of the present disclosure.
Figure 5:
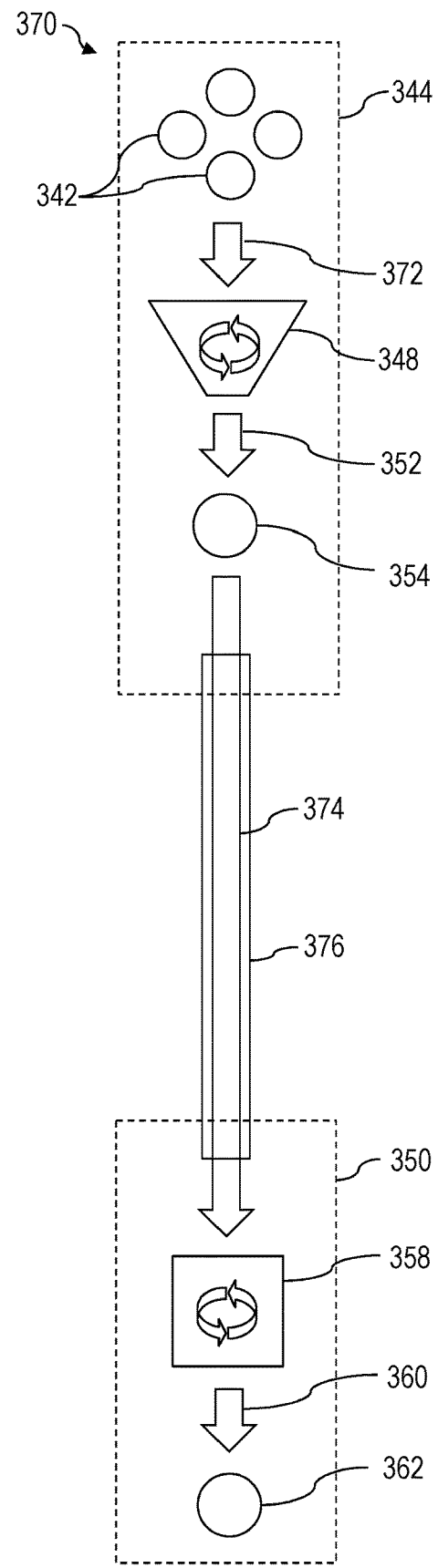
FIG. 5 is a flow-chart diagram of at least a portion of a process according to one or more aspects of the present disclosure.

FIGS. 4 and 5 are flow-chart diagrams showing example implementations of processes 340, 370 according to one or more aspects of the present disclosure. The process 340 shown in FIG. 4 may comprise generating the high resolution condition monitoring data 342 at a drill rig 344 and transmitting 345 such data 342 in real-time via a high bandwidth data pipeline 346 to a processing device 348 located at a remote (e.g., distant) location 350 from the drill rig 344. The data 342 may comprise, for example, the condition monitoring data 302, 304, 306, 308, 310 described above and shown in FIG. 3. The remote location 350 may be or comprise an offsite data center and/or server. As shown, the process 340 utilizes the high bandwidth data pipeline 346 to transmit the high resolution input data 342 in real-time over a long distance to the processing device 348, which may process the data 342 to generate or output 352 performance based condition indicators 354 and, thus, condense the data 342 at the remote location 350. The performance based condition indicators 354 may then be fed 356 to and processed by a processing device 358 comprising modeling or predictive processes, engines, algorithms, applications and/or other computer programs, which may determine and output 360 condition information 362 indicative of the condition of the piece of equipment and/or one or more of its components at the drill rig 344. The performance based condition indicators 354 may be saved in a database (such the historian 320 shown in FIG. 3) and accessed by the processing device 358. The processing device 358 may be operable to analyze current and historical performance based condition indicators 354 systematically or in real-time over a period of time, such as to recognize changes or trends in performance (e.g., execution) of actions caused by individual actuators or components. The recognized changes or trends may be indicative of developing or potential faults, which may be repaired or otherwise addressed before failure or large reductions in performance can manifest. Because both processing devices 348, 358 are located at the remote location 350, the performance based condition indicators 354 and the condition information 362 may be generated or outputted by single processing device.

The process 370 shown in FIG. 5 may comprise features of the process 340 shown in FIG. 4, including where indicated by the same numerals. The process 370 may comprise generating the high resolution condition monitoring data 342 at a drill rig 344 and feeding 372 such data 342 to the processing device 348, which may process the data 342 to generate or output 352 performance based condition indicators 354 and, thus, condense the data 342 at the drill rig 344. The condensed performance based condition indicators 354 may then be transmitted 374 in real-time via a low bandwidth data pipeline 376 to a processing device 358 located at a remote location 350 from the drill rig 344. The performance based condition indicators 354 may then be fed to and processed by a processing device 358 comprising modeling or predictive processes, engines, algorithms, applications and/or other computer programs, which may determine and output 360 condition information 362 indicative of the condition of the piece of equipment and/or one or more of its components at the remote location 350. Generating the condensed performance based condition indicators 354 at the drill rig 344 facilitates a reduction in data that has to be transmitted to the remote location 350, thereby reducing bandwidth prerequisites between the rig 344 and the remote location 350. Reduced bandwidth use may, in turn, reduce transmission interruptions and/or loss of transmitted data.

Figure 6:
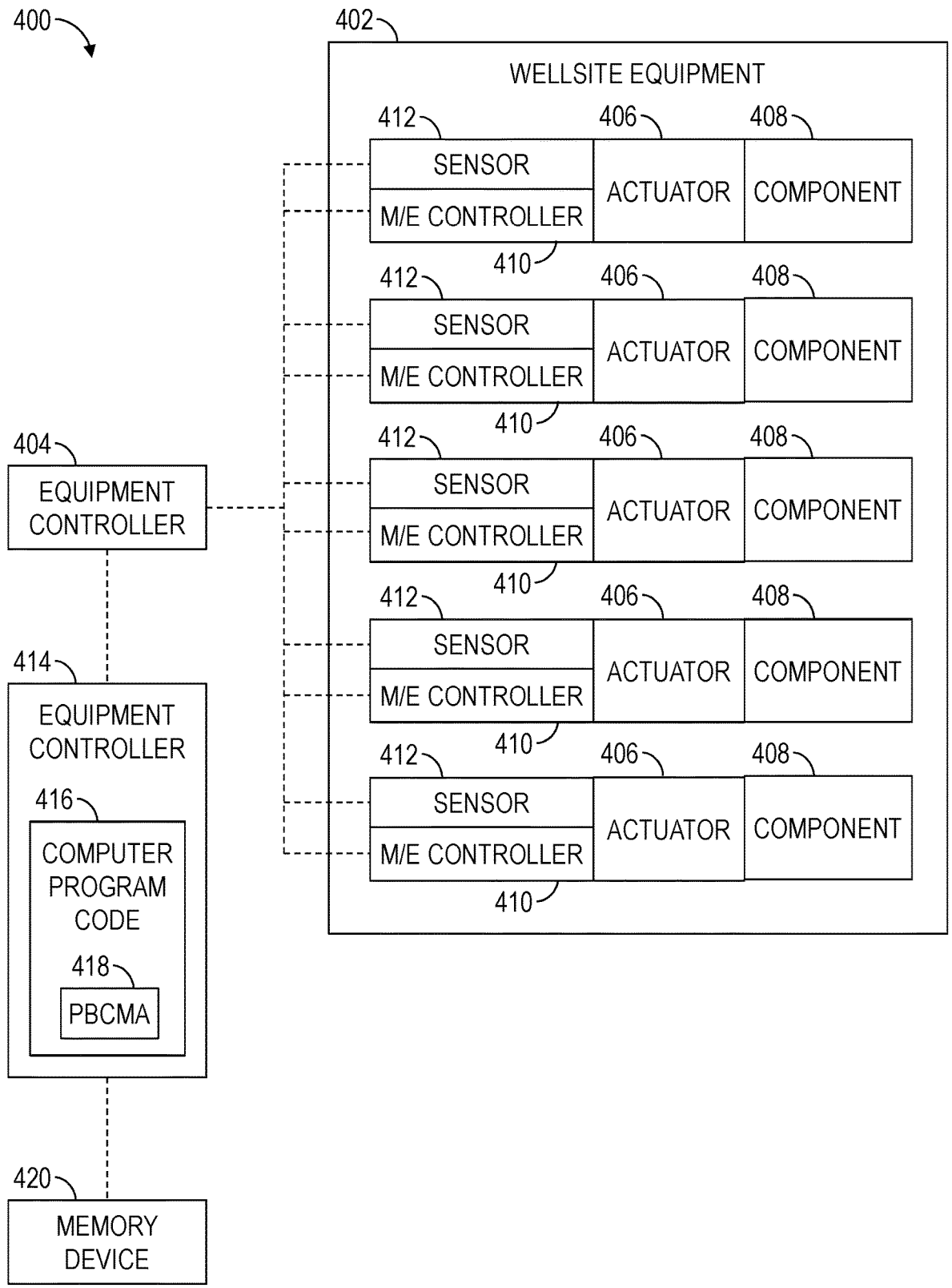
FIG. 6 is a schematic view of at least a portion of an example implementation of apparatus according to one or more aspects of the present disclosure.

FIG. 6 shows a schematic view of an example implementation of a monitoring and control system 400 for monitoring and controlling a piece of equipment 402 according to one or more aspects of the present disclosure. The control system 400 may be or comprise a portion of a well construction system, such as the well construction system 100 shown in FIG. 1. The piece of equipment 402 may be or comprise a piece of wellsite equipment of a well construction system, such as the well construction system 100 shown in FIG. 1. For example, the piece of equipment 402 may be or comprise a top drive 116, a draw works 119, an iron roughneck 151, a PHM 163, a catwalk 131, a mud pump 144, a BOP control unit 137, a portion of the fluid reconditioning equipment 170, or another piece of pipe handling equipment.

The piece of equipment 402 may comprise a plurality of actuators 406, each operable to actuate a corresponding member, part, or component 408 of the piece of equipment 402 to perform a corresponding action (e.g., work, operation, task, process, etc.). The actuators 406 may be or comprise hydraulic cylinders, hydraulic motors, and/or electrical motors, among other examples. The components 408 may be or comprise arms, grippers, brackets, dollies, trolleys, drums, and wheels, among other examples. The piece of equipment 402 may further comprise a plurality of mechanical and/or electrical controllers 410, each selectively operable to power or otherwise operate a corresponding actuator 406 to perform an action via a corresponding component 408. The mechanical controllers 410 may be or comprise hydraulic valves and pneumatic valves, among other examples, and the electrical controllers 410 may be or comprise electrical relays and VFDs, among other examples. The piece of equipment 402 may further comprise a plurality of sensors 412, each disposed in association with a corresponding actuator 406 and/or component 408, and operable to generate sensor data (e.g., sensor signals, measurements) indicative of physical status (i.e., operational status) caused by the corresponding actuator 406 and/or experienced by the component 408. The sensors 412 may be or comprise position sensors (e.g., encoders, rotary potentiometers, linear potentiometers, synchros, resolvers, proximity sensors, Hall effect sensors, and/or rotary variable-differential transformers (RVDTs)), pressure sensors, temperature sensors, and force sensors (e.g., load cells), among other examples.

The mechanical and/or electrical controllers 410 and the sensors 412 may be communicatively connected with an equipment controller 404, thereby permitting the equipment controller 414 to receive and process the sensor data, and transmit control commands (i.e., control signals) based on the sensor data to the mechanical and/or electrical controllers 410 to cause the actuators 406 to perform the intended actions. The equipment controller 404 may be a local or direct controller (e.g., a PLC) associated with the piece of equipment 402. The equipment controller 404 may be communicatively connected to another equipment controller 414, which may be or comprise a coordinated controller (e.g., PC, IPC) operable to store execute machine-readable and executable program code instructions (i.e., computer program code 416) in a memory device of the equipment controller 414. The equipment controller 414 may be located at a remote location from the equipment 402 and/or the equipment controller 404.

The computer program code 416 may comprise a performance based condition monitoring application (PBCMA) 418, which when executed, may be operable to receive from the equipment controller 404 the sensor data generated by the sensors 412. The performance based condition monitoring application 418 may also receive control commands, process description data, process variance data, and process contextual data generated, outputted, and/or utilized by at least one of the equipment controllers 404, 414 and/or other sensors associated with the piece of equipment. The performance based condition monitoring application 418 may comprise various mathematical algorithms, mathematical functions, logical functions, and other machine functions, such as may comprise mathematical and logical calculations with inputs and outputs. The performance based condition monitoring application 418, which when executed, may be further operable to process the input data and generate performance based condition indicators indicative of condition of the piece of equipment 402 based on the input data.

The performance based condition indicators may be stored by the equipment controller 414 or on an external memory device 420. Current and historical performance based condition indicators may be analyzed systematically or in real-time over a period of time by the performance based condition monitoring application 418 to recognize changes or trends in performance of the individual actuators 406 and/or components 408. Such trends may be indicative of developing or potential faults, which may be repaired or otherwise addressed before failure or large reductions in performance can manifest. When the performance based condition indicators fall below a predetermined performance threshold, the equipment controller 414 may generate or output condition information indicative of health of the piece of equipment to a wellsite operator via an output device.

Figure 7:
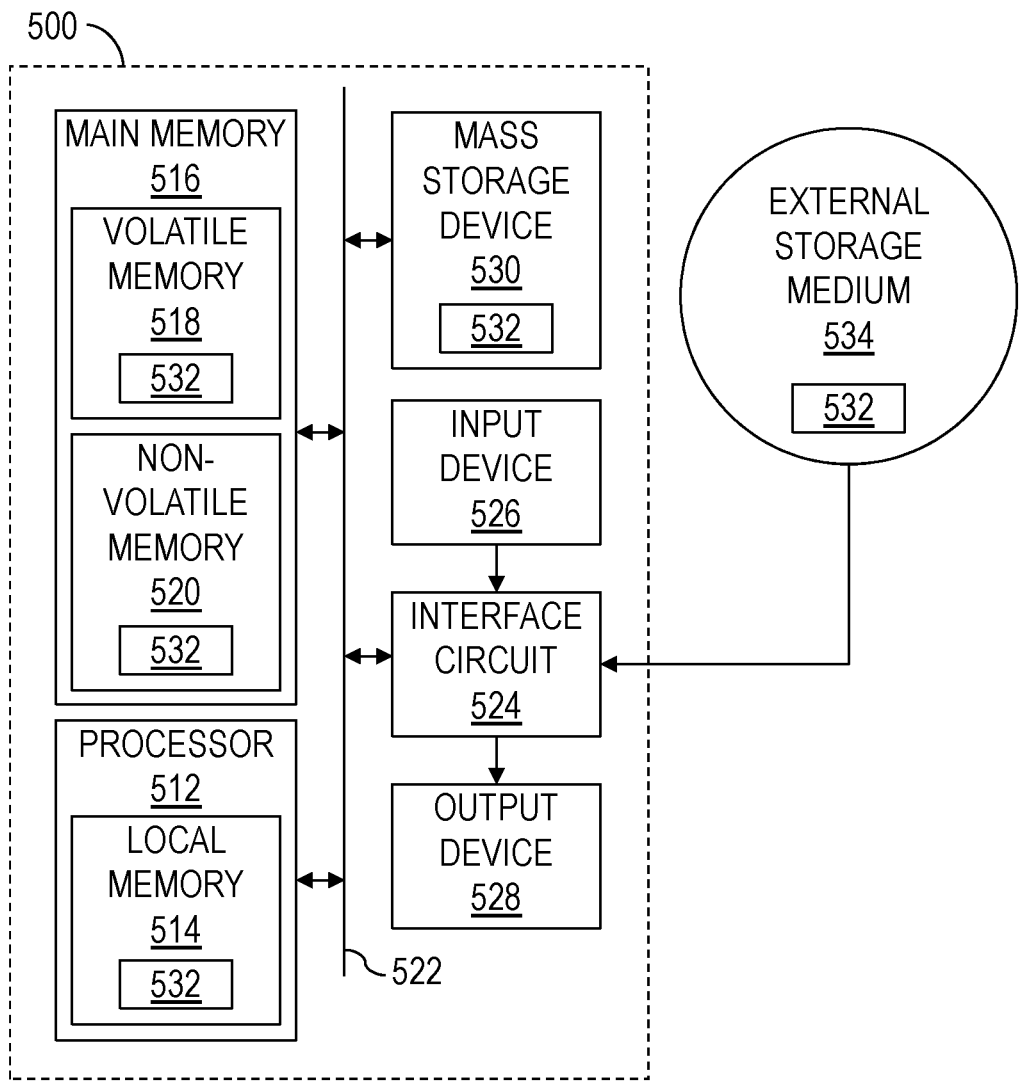
FIG. 7 is a schematic view of at least a portion of an example implementation of apparatus according to one or more aspects of the present disclosure.

FIG. 7 is a schematic view of at least a portion of an example implementation of a processing system 500 (or device) according to one or more aspects of the present disclosure. The processing system 500 may be or form at least a portion of one or more equipment controllers and/or other processing systems shown in one or more of the FIGS. 1-6. Accordingly, the following description refers to FIGS. 1-7, collectively.

The processing system 500 may be or comprise, for example, one or more processors, controllers, special-purpose computing devices, PCs (e.g., desktop, laptop, and/or tablet computers), personal digital assistants, smartphones, IPCs, PLCs, servers, internet appliances, and/or other types of computing devices. The processing system 500 may be or form at least a portion of the processing devices 192, 202, 312, 322, 348, 358 and/or equipment controllers 221-226, 404, 414. Although it is possible that the entirety of the processing system 500 is implemented within one device, it is also contemplated that one or more components or functions of the processing system 500 may be implemented across multiple devices, some or an entirety of which may be at the wellsite and/or remote from the wellsite.

The processing system 500 may comprise a processor 512, such as a general-purpose programmable processor. The processor 512 may comprise a local memory 514, and may execute machine-readable and executable program code instructions 532 (i.e., computer program code) present in the local memory 514 and/or another memory device. The processor 512 may execute, among other things, the program code instructions 532 and/or other instructions and/or programs to implement the example methods, processes, and/or operations described herein. The program code instructions 532 stored in the local memory 514, when executed by the processor 512 of the processing system 500, may cause one or more portions or pieces of wellsite equipment of a well construction system to perform the example methods and/or operations described herein. The processor 512 may be, comprise, or be implemented by one or more processors of various types suitable to the local application environment, and may include one or more of general-purpose computers, special-purpose computers, microprocessors, digital signal processors (DSPs), field-programmable gate arrays (FPGAs), application-specific integrated circuits (ASICs), and processors based on a multi-core processor architecture, as non-limiting examples. Examples of the processor 512 include one or more INTEL microprocessors, microcontrollers from the ARM and/or PICO families of microcontrollers, embedded soft/hard processors in one or more FPGAs.

The processor 512 may be in communication with a main memory 516, such as may include a volatile memory 518 and a non-volatile memory 520, perhaps via a bus 522 and/or other communication means. The volatile memory 518 may be, comprise, or be implemented by random access memory (RAM), static random access memory (SRAM), synchronous dynamic random access memory (SDRAM), dynamic random access memory (DRAM), RAMBUS dynamic random access memory (RDRAM), and/or other types of random access memory devices. The non-volatile memory 520 may be, comprise, or be implemented by read-only memory, flash memory, and/or other types of memory devices. One or more memory controllers (not shown) may control access to the volatile memory 518 and/or non-volatile memory 520.

The processing system 500 may also comprise an interface circuit 524, which is in communication with the processor 512, such as via the bus 522. The interface circuit 524 may be, comprise, or be implemented by various types of standard interfaces, such as an Ethernet interface, a universal serial bus (USB), a third generation input/output (3GIO) interface, a wireless interface, a cellular interface, and/or a satellite interface, among others. The interface circuit 524 may comprise a graphics driver card. The interface circuit 524 may comprise a communication device, such as a modem or network interface card to facilitate exchange of data with external computing devices via a network (e.g., Ethernet connection, digital subscriber line (DSL), telephone line, coaxial cable, cellular telephone system, satellite, etc.).

The processing system 500 may be in communication with various video cameras, sensors, actuators, equipment controllers, and other devices of the well construction system via the interface circuit 524. The interface circuit 524 can facilitate communications between the processing system 500 and one or more devices by utilizing one or more communication protocols, such as an Ethernet-based network protocol (such as ProfiNET, OPC, OPC/UA, Modbus TCP/IP, EtherCAT, UDP multicast, Siemens S7 communication, or the like), a proprietary communication protocol, and/or another communication protocol.

One or more input devices 526 may also be connected to the interface circuit 524. The input devices 526 may permit human wellsite operators 195 to enter the program code instructions 532, which may be or comprise control commands, operational parameters, and/or operational setpoints. The program code instructions 532 may further comprise modeling or predictive routines, equations, algorithms, processes, engines, algorithms, applications (e.g., a performance based condition monitoring application), and/or other programs operable to calculate performance based condition indicators and predict or determine condition of a piece of equipment and/or one or more of its components based on the performance based condition indicators, as described herein. The input devices 526 may be, comprise, or be implemented by a keyboard, a mouse, a joystick, a touchscreen, a track-pad, a trackball, an isopoint, and/or a voice recognition system, among other examples. One or more output devices 528 may also be connected to the interface circuit 524. The output devices 528 may permit for visualization or other sensory perception of various data, such as sensor data, status data, and/or other example data. The output devices 528 may be, comprise, or be implemented by video output devices (e.g., an LCD, an LED display, a CRT display, a touchscreen, etc.), printers, and/or speakers, among other examples. The one or more input devices 526 and the one or more output devices 528 connected to the interface circuit 524 may, at least in part, facilitate the HMIs described herein.

The processing system 500 may comprise a mass storage device 530 for storing data and program code instructions 532. The mass storage device 530 may be connected to the processor 512, such as via the bus 522. The mass storage device 530 may be or comprise a tangible, non-transitory storage medium, such as a floppy disk drive, a hard disk drive, a compact disk (CD) drive, and/or digital versatile disk (DVD) drive, among other examples. The processing system 500 may be communicatively connected with an external storage medium 534 via the interface circuit 524. The external storage medium 534 may be or comprise a removable storage medium (e.g., a CD or DVD), such as may be operable to store data and program code instructions 532.

As described above, the program code instructions 532 may be stored in the mass storage device 530, the main memory 516, the local memory 514, and/or the removable storage medium 534. Thus, the processing system 500 may be implemented in accordance with hardware (perhaps implemented in one or more chips including an integrated circuit, such as an ASIC), or may be implemented as software or firmware for execution by the processor 512. In the case of firmware or software, the implementation may be provided as a computer program product including a non-transitory, computer-readable medium or storage structure embodying computer program code instructions 532 (i.e., software or firmware) thereon for execution by the processor 512. The program code instructions 532 may include program instructions or computer program code that, when executed by the processor 512, may cause one or more portions of the well construction system 100 to perform intended methods, processes, and/or operations disclosed herein.

Figure 8:
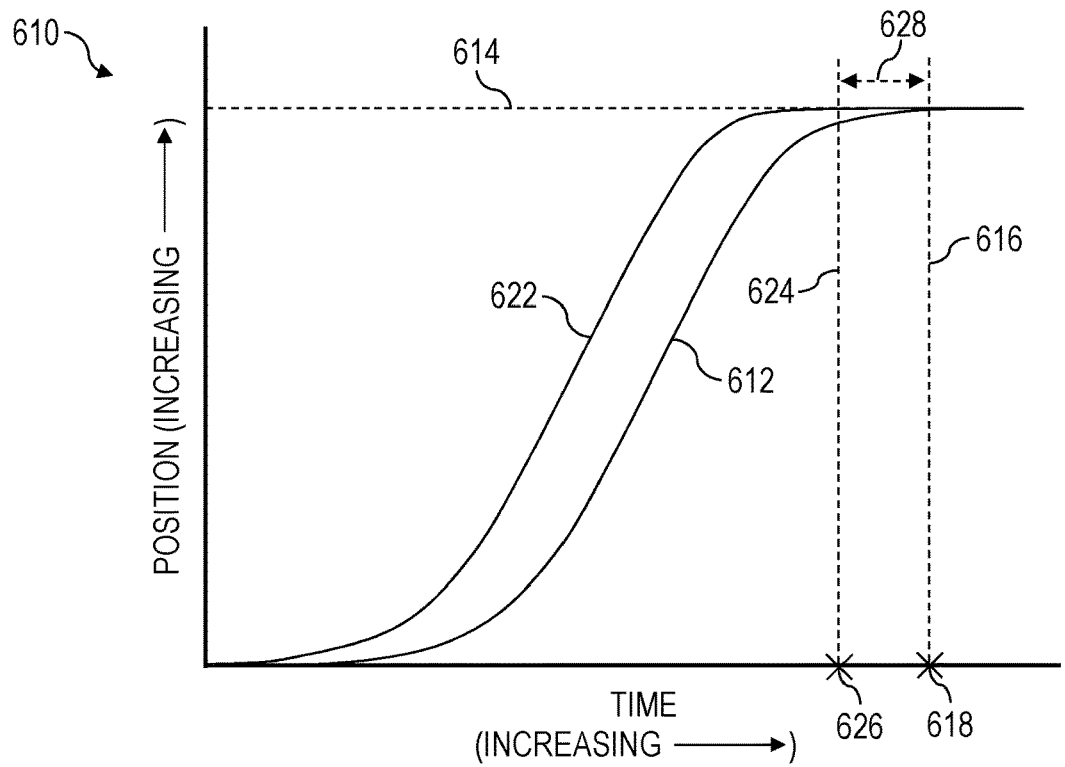
FIG. 8 is a graph related to one or more aspects of the present disclosure.

FIG. 8 is a graph 610 showing a single performance based condition indicator, namely a position profile 612 of a component of a piece of wellsite equipment while performing an action. The profile 612 shows the relationship between position of the component, plotted along the vertical axis, and time, plotted along the horizontal axis. The profile 612 may be determined by a processing device, such as the processing system 500, based on sensor data generated by a position sensor associated with the component. The horizontal axis may be indicative of the starting position of the component, and a horizontal reference line 614 may be indicative of the final position. Furthermore, the vertical axis may be indicative of the starting (i.e., trigger) time of the action performed by the component, and a vertical reference line 616 may be indicative of the time 618 at which the action is completed. The amount of time 618 for the action to be completed (e.g., travel time, cycle time) may be calculated and saved by the processing device as a single instance (i.e., sample) of a performance based condition indicator. The graph 610 further shows an intended position profile 622 of the component while performing the action. The profile 622 shows the relationship between an intended position of the component, plotted along the vertical axis, and time, plotted along the horizontal axis. The profile 612 may be determined by the processing device based on control commands (i.e., control signals) generated by an equipment controller for controlling the piece of equipment. The vertical axis may be indicative of the starting time of the action performed by the component, and a vertical reference line 624 may be indicative of the time 626 at which the control command intended to complete the action. The lag time 628 (i.e., controller deviation) between the actual 618 and intended 626 completion times of the action may be calculated and saved by the processing device as a single instance of a performance based condition indicator in addition to or instead of the amount of time 618 for the action to be completed.

Figure 9:
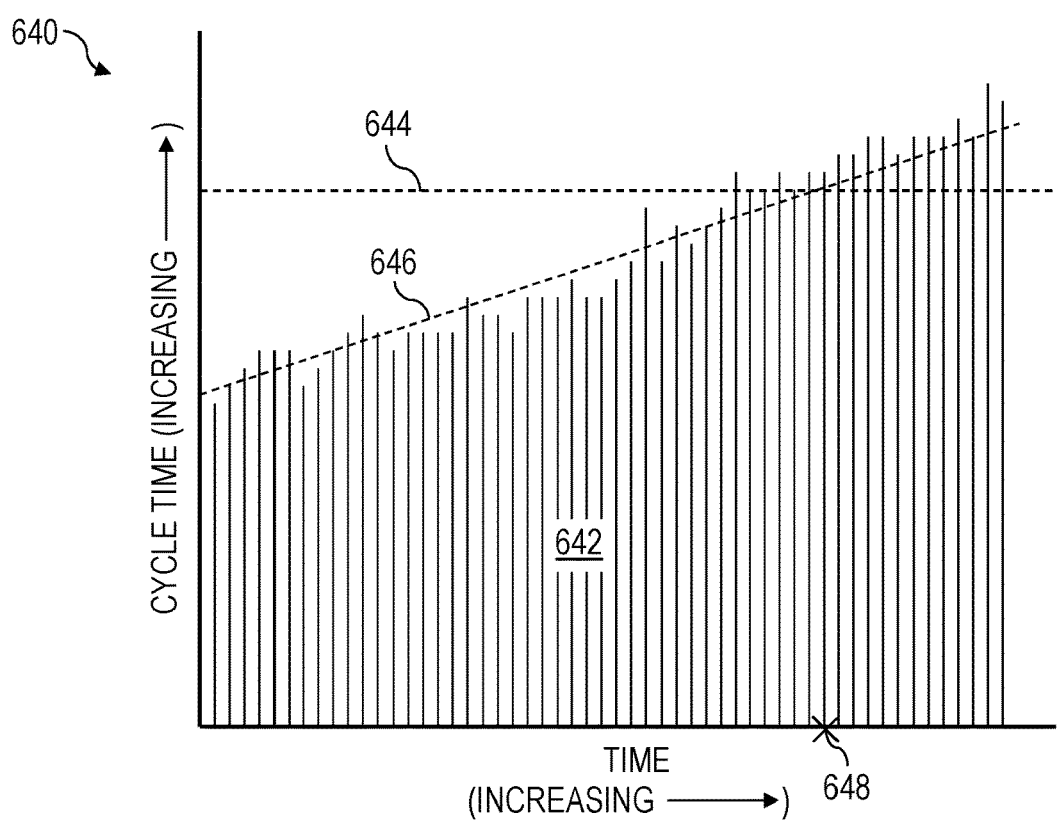
FIG. 9 is a graph related to one or more aspects of the present disclosure.

FIG. 9 is a graph 640 showing a plurality performance based condition indicators 642, namely cycle (i.e., travel) times 642 of a component of a piece of wellsite equipment recorded over time. The graph 640 shows that the cycle times 642 are progressively increasing, which may indicate that quality of performance (i.e., performance as intended) or execution of the corresponding action is progressively decreasing. Such trend may be indicative of declining condition of the actuator and/or component facilitating the corresponding action. The graph 640 may be generated by a processing device, such as the processing system 500, based on recorded historical and current cycle times. The processing device may generate and output condition information indicative of the condition of the actuator and/or component of the piece of equipment based on the performance based condition indicators 642. For example, the processing device may output condition information indicative of remaining life of the corresponding actuator and/or component. Furthermore, a threshold of acceptable condition, indicated by line 644, may be set. Accordingly, if a predetermined number of consecutive performance based condition indicators 642 meet or exceed the threshold 644, such as at time 648, the processing device may at such time 648 output condition information suggesting or mandating that maintenance on the piece of equipment be performed. Furthermore, if a running average of the performance based condition indicators 642, indicated by line 646, meets or exceeds the threshold 644, such as at time 648, the processing device may at such time 648 output condition information suggesting or mandating that maintenance on the piece of equipment be performed. Although graph 640 shows a plurality of performance based condition indicators 642 indicative of cycle time, the processing device can record and analyze other performance based condition indicators for changes or trends over time, which are indicative of progressive decrease in quality of performance or execution of the corresponding action.

Figure 10:
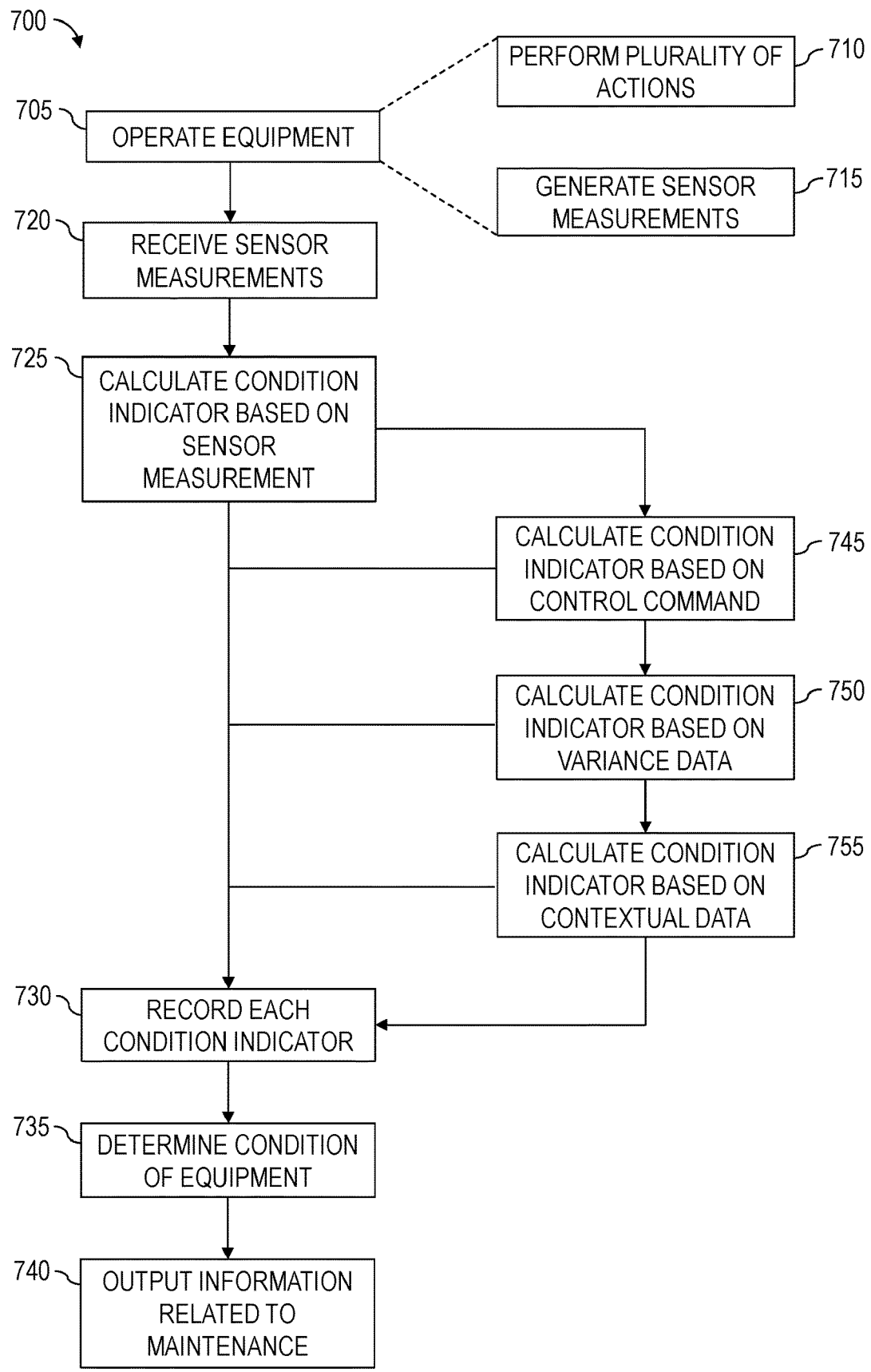
FIG. 10 is a flow-chart diagram of at least a portion of a method according to one or more aspects of the present disclosure.

FIG. 10 is a flow-chart diagram of at least a portion of an example implementation of a process or method (700) according to one or more aspects of the present disclosure. The method (700) may be performed utilizing or otherwise in conjunction with at least a portion of one or more implementations of one or more instances of the apparatus shown in one or more of FIGS. 1-9, and/or otherwise within the scope of the present disclosure. For example, the method (700) may be performed and/or caused, at least partially, by a processing system (e.g., processing system 500 shown in FIG. 7) executing program code instructions according to one or more aspects of the present disclosure. Thus, the following description of the method (700) also refers to apparatus shown in one or more of FIGS. 1-9. However, the method (700) may also be performed in conjunction with implementations of apparatus other than those depicted in FIGS. 1-9 that are also within the scope of the present disclosure.

The method (700) may comprise operating (705) a piece of equipment 402 at an oil and gas wellsite by performing (710) a plurality actions by a component 408 of the piece of equipment 402 and generating (715) a plurality of sensor measurements, wherein each sensor measurement may be indicative of a corresponding action. The method (700) may further comprise receiving (720) the plurality of sensor measurements by a processing system 500, calculating (725) a condition indicator for each component based on a corresponding sensor measurement, recording (730) each condition indicator over a period of time, and determining (735) condition of the piece of equipment 402 based on at least one of the condition indicators recorded over time. Each condition indicator may be indicative of performance of a corresponding action, and determining (735) the condition of the piece of equipment 402 may be based on change in at least one of the condition indicators recorded over time. The plurality of sensor measurements may be received (720) and the condition indicator may be calculated (725) in real-time while the actions are performed. The method (700) may further comprise outputting (740) information related to maintenance of the piece of equipment 402 when at least one of the condition indicators recorded over time meets or falls below a predetermined threshold.

The method (700) may further comprise calculating (745) the condition indicator for each component 408 further based on a control command configured to initiate a corresponding action. The method (700) may further comprise calculating (750) the condition indicator for each component 408 further based on a variance data indicative of a changed condition affecting at least one action thereby skewing a corresponding sensor measurement, wherein the variance data causes a shift in a corresponding sensor measurement to compensate for the changed condition. The method (700) may further comprise calculating (755) the condition indicator for each component 408 further based on a contextual data indicative of a changed condition affecting at least one action thereby invalidating a corresponding sensor measurement, wherein the contextual data causes a corresponding sensor measurement not to be used as a basis for calculating a corresponding condition indicator.

At least one of the sensor measurements may be indicative of position of an actuator 406 or component 408 of the piece of equipment 402 facilitating a corresponding action. At least one of the condition indicators may be indicative of travel time of an actuator 406 or component 408 of the piece of equipment 402 facilitating a corresponding action, average speed of an actuator 406 or component 408 of the piece of equipment 402 facilitating a corresponding action, or maximum speed of an actuator 406 or component 408 of the piece of equipment 402 facilitating a corresponding action.

In view of the entirety of the present disclosure, including the figures and the claims, a person having ordinary skill in the art will readily recognize that the present disclosure introduces a computer program product comprising a non-transitory, computer-readable medium comprising instructions that, when executed by a processor of a processing system, cause the processing system to: receive a plurality of sensor measurements each generated by a corresponding sensor of a piece of equipment at an oil and gas wellsite, wherein the piece of equipment comprises a plurality of actuators each operable to facilitate a corresponding action performed by a component of the piece of equipment, and wherein each sensor measurement is indicative of a corresponding action; generate a condition indicator for each sensor based on a corresponding sensor measurement; record each condition indicator over a period of time; and determine condition of the piece of equipment based on at least one of the condition indicators recorded over time.

Each condition indicator may be indicative of performance of a corresponding action facilitated by a corresponding actuator.

The instructions may cause the processing system to determine the condition of the piece of equipment based on change in at least one of the condition indicators recorded over time. The instructions may cause the processing system to output information related to maintenance of the piece of equipment when at least one of the condition indicators recorded over time meets or falls below a predetermined performance threshold.

The instructions may cause the processing system to generate the condition indicator for each sensor further based on a control command configured to initiate a corresponding action.

The instructions may cause the processing system to generate the condition indicator for at least one of the sensors further based on a variance data indicative of a changed condition affecting at least one action thereby skewing a corresponding sensor measurement, and the variance data may cause a shift in a corresponding sensor measurement to compensate for the changed condition.

The instructions may cause the processing system to generate the condition indicator for at least one of the sensors further based on a contextual data indicative of a changed condition affecting at least one action thereby invalidating a corresponding sensor measurement, and the contextual data may cause a corresponding sensor measurement not to be used as a basis for calculating a corresponding condition indicator.

At least one of the sensor measurements may be indicative of position of a corresponding actuator or component of the piece of equipment during a corresponding action.

At least one of the condition indicators may be indicative of: travel time of a corresponding actuator or component of the piece of equipment during a corresponding action; average speed of a corresponding actuator or component of the piece of equipment during a corresponding action; or maximum speed of a corresponding actuator or component of the piece of equipment during a corresponding action.

The instructions may cause the processing system to receive the plurality of sensor measurements and generate the condition indicators for each sensor in real-time while the actuators facilitate corresponding actions.

The present disclosure also introduces a method comprising operating a piece of equipment at an oil and gas wellsite by: performing a plurality actions by a component of the piece of equipment; and generating a plurality of sensor measurements, wherein each sensor measurement is indicative of a corresponding action. The method may also comprise receiving the plurality of sensor measurements by a processing system; calculating a condition indicator for each component based on a corresponding sensor measurement; recording each condition indicator over a period of time; and determining condition of the piece of equipment based on at least one of the condition indicators recorded over time.

Each condition indicator may be indicative of performance of a corresponding action.

Determining the condition of the piece of equipment may be based on change in at least one of the condition indicators recorded over time. The method may comprise outputting information related to maintenance of the piece of equipment when at least one of the condition indicators recorded over time meets or falls below a predetermined performance threshold.

The method may comprise calculating the condition indicator for each component further based on a control command configured to initiate a corresponding action.

The method may comprise calculating the condition indicator for each component further based on a variance data indicative of a changed condition affecting at least one action thereby skewing a corresponding sensor measurement, and the variance data may cause a shift in a corresponding sensor measurement to compensate for the changed condition.

The method may comprise calculating the condition indicator for each component further based on a contextual data indicative of a changed condition affecting at least one action thereby invalidating a corresponding sensor measurement, and the contextual data may cause a corresponding sensor measurement not to be used as a basis for calculating a corresponding condition indicator.

At least one of the sensor measurements may be indicative of position of an actuator or component of the piece of equipment facilitating a corresponding action.

At least one of the condition indicators may be indicative of: travel time of an actuator or component of the piece of equipment facilitating a corresponding action; average speed of an actuator or component of the piece of equipment facilitating a corresponding action; or maximum speed of an actuator or component of the piece of equipment facilitating a corresponding action.

The plurality of sensor measurements may be received and the condition indicator may be generated in real-time while the actions are performed.

The present disclosure also introduces a system comprising: (A) a piece of equipment at an oil and gas wellsite comprising: (1) a plurality of actuators each operable to facilitate a corresponding action by a component of the piece of equipment; and (2) a plurality of sensors each operable to generate a signal indicative of an operational parameter associated with a corresponding action; (B) a processing system comprising a processor and a memory storing a computer program code that, when executed, causes the processing system to: (1) receive the plurality of signals; (2) generate a condition indicator for each action based on a corresponding signal; (3) record each condition indicator over a period of time; and (4) determine condition of the piece of equipment based on at least one of the condition indicators recorded over time.

Each condition indicator may be indicative of quality of performance of a corresponding action.

The condition of the piece of equipment may be determined based on change in at least one of the condition indicators recorded over time. The computer program code may cause the processing system to output information related to maintenance of the piece of equipment when at least one of the condition indicators recorded over time meets or falls below a predetermined performance threshold.

The computer program code may cause the processing system to generate the condition indicator for each action further based on a control command configured to initiate a corresponding action.

The computer program code may cause the processing system to generate the condition indicator for each action further based on a variance data indicative of a changed condition affecting at least one action thereby skewing a corresponding signal, and the variance data may cause a shift in a corresponding signal to compensate for the changed condition.

The computer program code may cause the processing system to generate the condition indicator for each action further based on a contextual data indicative of a changed condition affecting at least one action thereby invalidating a corresponding signal, and the contextual data may cause a corresponding signal not to be used as a basis for calculating a corresponding condition indicator.

At least one of the operational parameters may comprise position of the actuator or component of the piece of equipment while a corresponding action is performed.

At least one of the condition indicators may be indicative of: travel time of the actuator or component of the piece of equipment while a corresponding action is performed; average speed the actuator or component of the piece of equipment while a corresponding action is performed; or maximum speed of the actuator or component of the piece of equipment while a corresponding action is performed.

The plurality of sensor measurements may be received and each condition indicator may be generated in real-time while the actions are performed.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same functions and/or achieving the same benefits of the embodiments introduced herein. A person having ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to comply with 37 C.F.R. § 1.72(b) to permit the reader to quickly ascertain the nature of the technical disclosure. It is submitted with the understanding that it will not be used to interpret or limit the scope or meaning of the claims.

What is claimed is:

1. A computer program product comprising:
a non-transitory, computer-readable medium comprising instructions that, when executed by a processor of a processing system, cause the processing system to:
receive a plurality of sensor measurements each generated by a corresponding sensor of a piece of equipment at an oil and gas wellsite, wherein the piece of equipment comprises a plurality of actuators each operable to facilitate a corresponding action performed by a component of the piece of equipment, wherein each sensor measurement is indicative of a corresponding action, and wherein at least one of the sensor measurements is indicative of position of a corresponding actuator or component of the piece of equipment during a corresponding action;
generate a condition indicator for each sensor based on a corresponding sensor measurement and a control command configured to initiate a corresponding action;
record each condition indicator over a period of time; and
determine condition of the piece of equipment based on at least one of the condition indicators recorded over time.

2. The computer program product of claim 1 wherein each condition indicator is indicative of performance of a corresponding action facilitated by a corresponding actuator.

3. The computer program product of claim 1 wherein the instructions cause the processing system to determine the condition of the piece of equipment based on change in at least one of the condition indicators recorded over time.

4. The computer program product of claim 3 wherein the instructions further cause the processing system to output information related to maintenance of the piece of equipment when at least one of the condition indicators recorded over time meets or falls below a predetermined performance threshold.

5. The computer program product of claim 1 wherein the instructions further cause the processing system to generate the condition indicator for at least one of the sensors further based on variance data indicative of a changed condition affecting at least one action thereby skewing a corresponding sensor measurement, and wherein the variance data causes a shift in a corresponding sensor measurement to compensate for the changed condition.

6. The computer program product of claim 1 wherein the instructions further cause the processing system to generate the condition indicator for at least one of the sensors further based on a contextual data indicative of a changed condition affecting at least one action thereby invalidating a corresponding sensor measurement, and wherein the contextual data causes a corresponding sensor measurement not to be used as a basis for calculating a corresponding condition indicator.

7. The computer program product of claim 1 wherein at least one of the condition indicators is indicative of:
travel time of a corresponding actuator or component of the piece of equipment during a corresponding action;
average speed of a corresponding actuator or component of the piece of equipment during a corresponding action; or
maximum speed of a corresponding actuator or component of the piece of equipment during a corresponding action.

8. The computer program product of claim 1 wherein the instructions cause the processing system to receive the plurality of sensor measurements and generate the condition indicators for each sensor in real-time while the actuators facilitate corresponding actions.

9. A method comprising:
operating a piece of equipment at an oil and gas wellsite by:
performing a plurality actions by a component of the piece of equipment; and
generating a plurality of sensor measurements, wherein each sensor measurement is indicative of a corresponding action and wherein at least one of the sensor measurements is indicative of position of an actuator or component of the piece of equipment facilitating a corresponding action;
receiving the plurality of sensor measurements by a processing system;
calculating a condition indicator for each component based on a corresponding sensor measurement and a control command configured to initiate a corresponding action;
recording each condition indicator over a period of time; and
determining condition of the piece of equipment based on at least one of the condition indicators recorded over time.

10. The method of claim 9 wherein each condition indicator is indicative of performance of a corresponding action.

11. The method of claim 9 wherein determining the condition of the piece of equipment is based on change in at least one of the condition indicators recorded over time.

12. The method of claim 11 further comprising outputting information related to maintenance of the piece of equipment when at least one of the condition indicators recorded over time meets or falls below a predetermined performance threshold.

13. The method of claim 9 further comprising calculating the condition indicator for each component further based on variance data indicative of a changed condition affecting at least one action thereby skewing a corresponding sensor measurement, and wherein the variance data causes a shift in a corresponding sensor measurement to compensate for the changed condition.

14. The method of claim 9 further comprising calculating the condition indicator for each component further based on a contextual data indicative of a changed condition affecting at least one action thereby invalidating a corresponding sensor measurement, and wherein the contextual data causes a corresponding sensor measurement not to be used as a basis for calculating a corresponding condition indicator.

15. The method of claim 9 wherein at least one of the condition indicators is indicative of:
travel time of an actuator or component of the piece of equipment facilitating a corresponding action;
average speed of an actuator or component of the piece of equipment facilitating a corresponding action; or
maximum speed of an actuator or component of the piece of equipment facilitating a corresponding action.

16. The method of claim 9 wherein the plurality of sensor measurements is received and the condition indicator is generated in real-time while the actions are performed.

17. A system comprising:
a piece of equipment at an oil and gas wellsite comprising:
a plurality of actuators each operable to facilitate a corresponding action by a component of the piece of equipment; and
a plurality of sensors each operable to generate a signal indicative of an operational parameter associated with a corresponding action, wherein at least one of the operational parameters comprises position of the actuator or component of the piece of equipment while a corresponding action is performed;
a processing system comprising a processor and a memory storing a computer program code, which when executed, causes the processing system to:
receive the plurality of signals;
generate a condition indicator for each action based on a corresponding signal and a control command configured to initiate a corresponding action;
record each condition indicator over a period of time; and
determine condition of the piece of equipment based on at least one of the condition indicators recorded over time.

18. The system of claim 17 wherein each condition indicator is indicative of quality of performance of a corresponding action.

19. The system of claim 17 wherein the condition of the piece of equipment is determined based on change in at least one of the condition indicators recorded over time.

20. The system of claim 19 wherein the computer program code further causes the processing system to output information related to maintenance of the piece of equipment when at least one of the condition indicators recorded over time meets or falls below a predetermined performance threshold.

21. The system of claim 17 wherein the computer program code further causes the processing system to generate the condition indicator for each action further based on variance data indicative of a changed condition affecting at least one action thereby skewing a corresponding signal, and wherein the variance data causes a shift in a corresponding signal to compensate for the changed condition.

22. The system of claim 17 wherein the computer program code further causes the processing system to generate the condition indicator for each action further based on a contextual data indicative of a changed condition affecting at least one action thereby invalidating a corresponding signal, and wherein the contextual data causes a corresponding signal not to be used as a basis for calculating a corresponding condition indicator.

23. The system of claim 17 wherein at least one of the condition indicators is indicative of:
travel time of the actuator or component of the piece of equipment while a corresponding action is performed;
average speed of the actuator or component of the piece of equipment while a corresponding action is performed; or
maximum speed of the actuator or component of the piece of equipment while a corresponding action is performed.

24. The system of claim 17 wherein the plurality of sensor measurements is received and each condition indicator is generated in real-time while the actions are performed.

* * * * *